United States Patent
Feng et al.

(10) Patent No.: US 11,941,733 B2
(45) Date of Patent: Mar. 26, 2024

(54) SYSTEM AND METHOD FOR MOTION SIGNAL RECALIBRATION

(71) Applicant: SHANGHAI UNITED IMAGING HEALTHCARE CO., LTD., Shanghai (CN)

(72) Inventors: Tao Feng, Houston, TX (US); Gang Yang, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 0 days.

(21) Appl. No.: 17/818,356

(22) Filed: Aug. 8, 2022

(65) Prior Publication Data
US 2022/0383566 A1 Dec. 1, 2022

Related U.S. Application Data

(63) Continuation of application No. 16/799,915, filed on Feb. 25, 2020, now Pat. No. 11,410,354.

(51) Int. Cl.
*G06T 11/00* (2006.01)

(52) U.S. Cl.
CPC ........ *G06T 11/008* (2013.01); *G06T 2210/41* (2013.01); *G06T 2211/412* (2013.01)

(58) Field of Classification Search
None
See application file for complete search history.

(56) References Cited

U.S. PATENT DOCUMENTS

| 11,270,434 B2 | 3/2022 | Schleyer et al. |
| 2009/0225933 A1* | 9/2009 | Shao ............... G01T 1/1611 378/15 |
| 2010/0189324 A1* | 7/2010 | Wollenweber ......... A61B 6/037 382/131 |
| 2010/0290683 A1 | 11/2010 | Demeester et al. |
| 2011/0046499 A1* | 2/2011 | Klewer ............... A61B 7/003 600/534 |
| 2012/0278055 A1 | 11/2012 | Schweizer et al. |
| 2016/0128664 A1 | 5/2016 | Manjeshwar et al. |
| 2016/0220151 A1 | 8/2016 | Zizi et al. |
| 2017/0079608 A1* | 3/2017 | Hamill ............... A61B 6/037 |
| 2017/0216627 A1 | 8/2017 | Brooks et al. |

(Continued)

FOREIGN PATENT DOCUMENTS

| CN | 107095691 A | 8/2017 |
| WO | 2017148094 A1 | 9/2017 |
| WO | 2018118119 A1 | 6/2018 |

*Primary Examiner* — Oneal R Mistry
(74) *Attorney, Agent, or Firm* — METIS IP LLC

(57) ABSTRACT

The present disclosure is related to systems and methods for motion signal recalibration. The method includes obtaining a motion signal of a subject based on positron emission tomography (PET) data of the subject. The motion signal may represent a plurality of motion cycles. The method includes determining a distribution of the motion cycles. The distribution of the motion cycles may indicate a probability that each motion cycle of the plurality of motion cycles corresponds to an actual motion cycle. The method includes correcting the motion cycles of the motion signal based on the distribution of the motion cycles to obtain corrected motion cycles. The method includes reconstructing a PET image by gating the PET data based on the corrected motion cycles.

19 Claims, 11 Drawing Sheets

(56) References Cited

U.S. PATENT DOCUMENTS

| | | | |
|---|---|---|---|
| 2019/0133542 A1* | 5/2019 | Li | A61B 6/5247 |
| 2020/0008770 A1* | 1/2020 | Salomon | A61B 6/5235 |
| 2020/0110145 A1* | 4/2020 | Zeller | A61B 5/7207 |
| 2020/0134886 A1 | 4/2020 | Tsui et al. | |
| 2020/0236545 A1 | 7/2020 | Xu et al. | |
| 2021/0106301 A1* | 4/2021 | Schleyer | G06T 7/20 |

* cited by examiner

SYSTEM AND METHOD FOR MOTION SIGNAL RECALIBRATION

CROSS-REFERENCE TO RELATED APPLICATIONS

This application is a continuation of U.S. application Ser. No. 16/799,915, filed on Feb. 25, 2020, the contents of which are hereby incorporated by reference.

TECHNICAL FIELD

This disclosure generally relates to systems and methods for signal processing, and more particularly, relates to systems and methods for recalibrating a motion signal.

BACKGROUND

Motions (e.g., respiratory motion, cardiac motion) during PET scans can cause resolution degradation and introduce artifacts in PET image that affect diagnoses performed on the basis of the PET image. Although respiratory gating can be used for reducing the effects of respiratory motion, this approach requires a reliable respiratory signal. Conventionally, a respiratory signal is acquired using an external device, such as a belt or a camera. However, the use of external devices often complicates a PET scanning procedure and further diminishes its clinical practicality.

Data-driven gating is proposed to obtain a respiratory signal directly from PET data. For example, the respiratory signal can be extracted by tracking total counts in a field of view (FOV), since the total counts change with tracer concentration moving in and out of the FOV due to motion. As another example, the respiratory signal can be extracted by applying principal component analysis (PCA) to time series of sinogram of PET data sampled at short sample durations. However, accurate signal extraction in data-driven gating depends on tracer concentration distribution and PET data quality.

For PET data with a relatively high noise, or reduced tracer uptake, the data-driven gating often fails. Specifically, inaccurate respiratory signals may be obtained in an early period of a scanning process (e.g., in five minutes from the beginning of the scanning process) due to a rapid change in tracer concentration distribution. Respiratory signals obtained in the early period of the scanning process is important for plasma/blood input determination in drug dynamic analysis and blood flow determination in organs (or tissues, tumors). Thus, it is desirable to develop a method and system for self-gating, i.e., recalibrating a motion signal (e.g., a respiratory signal, a cardiac motion signal) obtained in a period of rapid change in tracer concentration distribution without using an external device, to reduce the effects of respiratory and/or cardiac motion of the subject, and improve the quality of PET images reconstructed accordingly.

SUMMARY

According to an aspect of the present disclosure, a method for motion signal recalibration may be implemented on a computing device having one or more processors and one or more storage devices. The method may include obtaining a motion signal of a subject based on positron emission tomography (PET) data of the subject. The motion signal may represent a plurality of motion cycles. The method may include determining a distribution of the motion cycles. The distribution of the motion cycles may indicate a probability that each motion cycle of the plurality of motion cycles corresponds to an actual motion cycle. The method may include correcting the motion cycles of the motion signal based on the distribution of the motion cycles to obtain corrected motion cycles. The method may include reconstructing a PET image by gating the PET data based on the corrected motion cycles.

In some embodiments, the motion signal may include a respiratory signal including a plurality of peaks and a plurality of valleys. The motion cycles may be respiratory cycles. A respiratory cycle may include a duration between adjacent peaks or a duration between adjacent valleys. A half respiratory cycle may include a duration between a peak and a corresponding valley. The method may include determining a plurality of respiratory cycles based on the respiratory signal. The method may include determining a first distribution of the respiratory cycles based on the plurality of respiratory cycles. The first distribution may include at least one of an average respiratory cycle, a variance of the respiratory cycles, or a skewness of the first distribution. The method may include determining a plurality of half respiratory cycles based on the respiratory signal. The method may include determining a second distribution of the half respiratory cycles based on the plurality of half respiratory cycles. The second distribution may include at least one of an average half respiratory cycle, a variance of the half respiratory cycles, or a skewness of the second distribution.

In some embodiments, the method may include performing a first model fitting on the plurality of respiratory cycles to generate a first model fitting curve. The method may include performing a second model fitting on the plurality of half respiratory cycles to generate a second model fitting curve.

In some embodiments, at least one of the first model fitting or the second model fitting may be performed based on at least one of a Gaussian model or a pre-determined model based on population.

In some embodiments, the method may include, for each peak of the plurality of peaks of the respiratory signal, determining a first duration between the peak and a corresponding valley, a second duration between the peak and a next peak, and a third duration between the peak and a valley next to the corresponding valley. The method may include determining a probability that each of the first duration, the second duration, and the third duration corresponds to an actual respiratory cycle based on at least one of the first distribution of the respiratory cycles or the second distribution of the half respiratory cycles. The method may include determining the first duration, the second duration, or the third duration that has a maximum probability as the duration corresponding to the actual respiratory cycle. The method may include correcting the respiratory cycles of the respiratory signal based on the duration corresponding to the actual respiratory cycle.

In some embodiments, the method may include obtaining the PET data associated with the subject. The method may include determining a volume of interest (VOI) based on the PET data. The method may include determining the motion signal based on the VOI and the PET data.

In some embodiments, the method may include correcting the amplitude information of the motion signal. The method may include determining a target motion signal based on the corrected motion cycle and the corrected amplitude information of the motion signal. The method may include reconstructing the PET image by gating, based on the target motion signal, the PET data.

In some embodiments, the method may include determining an envelope of the motion signal. The envelope of the motion signal may include a high frequency component and a low frequency component. The method may include processing the envelope of the motion signal by reducing the low frequency component to obtain a processed envelope of the motion signal. The method may include correcting the amplitude information of the motion signal based on the processed envelope of the motion signal.

In some embodiments, an amplitude change rate of the high frequency component may be less than a threshold. An amplitude change rate of the low frequency component may be greater than the threshold.

In some embodiments, the threshold may be 20 seconds.

In some embodiments, the envelope of the motion signal may be determined by performing at least one of a Hilbert transformation or a moving-maximum operation on the motion signal.

In some embodiments, the method may include obtaining the low frequency component by performing a moving average filter on the envelope of the motion signal. The method may include reducing the low frequency component from the envelope of the motion signal.

In some embodiments, the method may include performing a high-pass filter on the envelope of the motion signal.

According to another aspect of the present disclosure, a method for motion signal recalibration may be implemented on a computing device having one or more processors and one or more storage devices. The method may include obtaining a motion signal associated with a subject based on PET data of the subject. The method may include determining an envelope of the motion signal. The envelope of the motion signal may include a high frequency component and a low frequency component. The method may include processing the envelope of the motion signal by reducing the low frequency component to obtain a processed envelope of the motion signal. The method may include determining a target motion signal by correcting, based on the processed envelope, amplitude information of the motion signal.

In some embodiments, the method may include reconstructing a PET image by gating the PET data based on the target motion signal.

In some embodiments, an amplitude change rate of the high frequency component may be less than a threshold. An amplitude change rate of the low frequency component may be greater than the threshold.

In some embodiments, the threshold may be 20 seconds.

In some embodiments, the envelope of the motion signal may be determined by performing a Hilbert transformation on the motion signal.

In some embodiments, the method may include obtaining the low frequency component by performing a moving average filter on the envelope of the motion signal. The method may include reducing the low frequency component from the envelope of the motion signal.

In some embodiments, the method may include performing a high-pass filter on the envelope of the motion signal.

According to another aspect of the present disclosure, a system for motion signal recalibration may include at least one storage device storing a set of instructions, and at least one processor in communication with the at least one storage device. When executing the stored set of instructions, the at least one processor may cause the system to perform a method. The method may include obtaining a motion signal of a subject based on positron emission tomography (PET) data of the subject. The motion signal may represent a plurality of motion cycles. The method may include determining a distribution of the motion cycles. The distribution of the motion cycles may indicate a probability that each motion cycle of the plurality of motion cycles corresponds to an actual motion cycle. The method may include correcting the motion cycles of the motion signal based on the distribution of the motion cycles to obtain corrected motion cycles. The method may include reconstructing a PET image by gating the PET data based on the corrected motion cycles.

According to another aspect of the present disclosure, a system for motion signal recalibration may include at least one storage device storing a set of instructions, and at least one processor in communication with the at least one storage device. When executing the stored set of instructions, the at least one processor may cause the system to perform a method. The method may include obtaining a motion signal associated with a subject based on PET data of the subject. The method may include determining an envelope of the motion signal. The envelope of the motion signal may include a high frequency component and a low frequency component. The method may include processing the envelope of the motion signal by reducing the low frequency component to obtain a processed envelope of the motion signal. The method may include determining a target motion signal by correcting, based on the processed envelope, amplitude information of the motion signal.

According to still another aspect of the present disclosure, a non-transitory computer readable medium may include at least one set of instructions. When executed by at least one processor of a computing device, the at least one set of instructions may cause the at least one processor to effectuate a method. The method may include obtaining a motion signal of a subject based on positron emission tomography (PET) data of the subject. The motion signal may represent a plurality of motion cycles. The method may include determining a distribution of the motion cycles. The distribution of the motion cycles may indicate a probability that each motion cycle of the plurality of motion cycles corresponds to an actual motion cycle. The method may include correcting the motion cycles of the motion signal based on the distribution of the motion cycles to obtain corrected motion cycles. The method may include reconstructing a PET image by gating the PET data based on the corrected motion cycles.

According to still another aspect of the present disclosure, a non-transitory computer readable medium may include at least one set of instructions. When executed by at least one processor of a computing device, the at least one set of instructions may cause the at least one processor to effectuate a method. The method may include obtaining a motion signal associated with a subject based on PET data of the subject. The method may include determining an envelope of the motion signal. The envelope of the motion signal may include a high frequency component and a low frequency component. The method may include processing the envelope of the motion signal by reducing the low frequency component to obtain a processed envelope of the motion signal. The method may include determining a target motion signal by correcting, based on the processed envelope, amplitude information of the motion signal.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
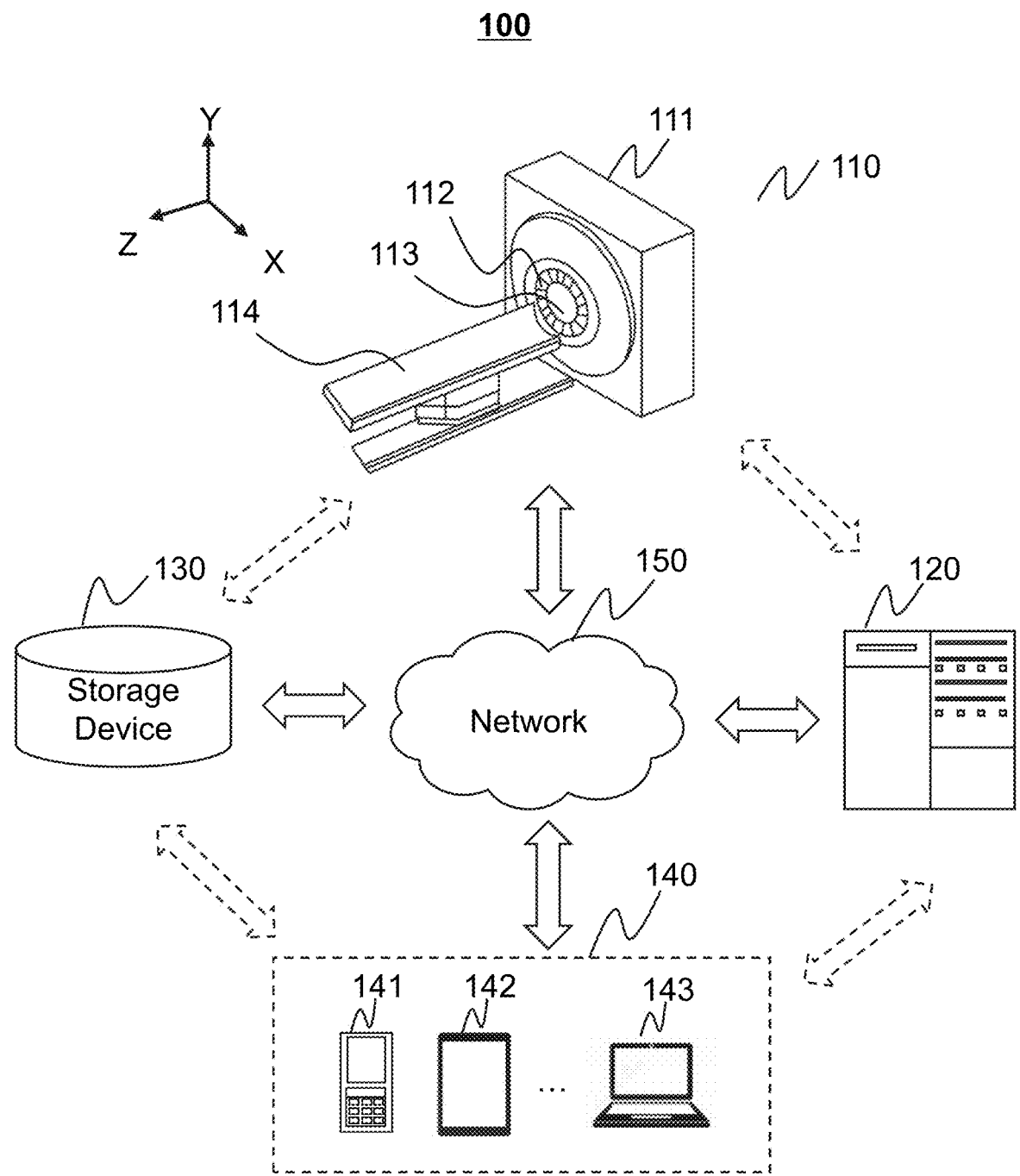
FIG. 1 is a schematic diagram illustrating an exemplary imaging system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Also, the term "exemplary" is intended to refer to an example or illustration.

It will be understood that the terms "system," "engine," "unit," "module," and/or "block" used herein are one method to distinguish different components, elements, parts, sections or assembly of different levels in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that, although the terms "first," "second," "third," etc., may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

Spatial and functional relationships between elements are described using various terms, including "connected," "attached," and "mounted." Unless explicitly described as being "direct," when a relationship between first and second elements is described in the present disclosure, that relationship includes a direct relationship where no other intervening elements are present between the first and second elements, and also an indirect relationship where one or more intervening elements are present (either spatially or functionally) between the first and second elements. In contrast, when an element is referred to as being "directly" connected, attached, or positioned to another element, there are no intervening elements present. Other words used to describe the relationship between elements should be interpreted in a like fashion (e.g., "between," versus "directly between," "adjacent," versus "directly adjacent," etc.).

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

An aspect of the present disclosure relates to a system and method for motion signals recalibration. According to some embodiments of the present disclosure, a processing device may obtain a motion signal (e.g., a respiratory signal) of a subject based on positron emission tomography (PET) data of the subject. The motion signal may include a plurality of motion cycles. The processing device may determine a distribution of the motion cycles. The distribution of the motion cycles may indicate a probability that each motion cycle of the plurality of motion cycles corresponds to an actual motion cycle. The processing device may correct the motion cycles of the motion signal based on the distribution of the motion cycles to obtain corrected motion cycles. The processing device may reconstruct a PET image by gating the PET data based on the corrected motion cycles.

Another aspect of the present disclosure relates to a system and method for self-gating in PET. According to some embodiments of the present disclosure, the processing device may obtain a motion signal (e.g., a respiratory signal) associated with a subject based on PET data of the subject. The processing device may determine an envelope of the motion signal. The envelope of the motion signal may include a high frequency component and a low frequency component. The processing device may process the envelope of the motion signal by reducing the low frequency component to obtain a processed envelope of the motion signal. The processing device may determine a target motion signal by correcting, based on the processed envelope, amplitude information of the motion signal.

Accordingly, the motion signal (e.g., the respiratory signal) obtained in a period of rapid change in tracer concentration distribution may be corrected based on the PET data of the subject without using an external device, which may achieve a self-gating in PET. The quality of the PET image reconstructed based on the corrected motion signal may further be improved.

FIG. 1 is a schematic diagram illustrating an exemplary imaging system according to some embodiments of the present disclosure. As illustrated, the imaging system 100 may include an imaging device 110, a processing device 120, a storage device 130, a terminal 140, and a network 150. The components of the imaging system 100 may be connected in one or more of various ways. Merely by way of example, as illustrated in FIG. 1, the imaging device 110 may be connected to the processing device 120 directly as indicated by the bi-directional arrow in dotted lines linking the imaging device 110 and the processing device 120, or through the network 150. As another example, the storage device 130 may be connected to the imaging device 110 directly as indicated by the bi-directional arrow in dotted lines linking the imaging device 110 and the storage device 130, or through the network 150. As still another example, the terminal 140 may be connected to the processing device 120 directly as indicated by the bi-directional arrow in dotted lines linking the terminal 140 and the processing device 120, or through the network 150.

In some embodiments, the imaging device 110 may scan a subject, and acquire data relating to the subject. In some embodiments, the imaging device 110 may be an emission computed tomography (ECT) device, a computed tomography (CT) device, a magnetic resonance imaging (MRI) device, an ultrasonography system, a multi-modality device, or the like, or any combination thereof. The ECT device may include a positron emission tomography (PET) device, a single photon emission computed tomography (SPECT) device, or the like. Exemplary multi-modality device may include a CT-PET device, an MR-PET device, or the like. In some embodiments, the multi-modality imaging device may include modules and/or components for performing ECT imaging and/or related analysis.

In some embodiments, the imaging device 110 may be a PET device including a gantry 111, a detector 112, a detection region 113, and a table 114. In the present disclosure, as shown in FIG. 1, a positive X axis direction may be from the left side to the right side of the gantry 112 viewed from the direction facing the front of the imaging device 110. A positive Y axis direction may be from the lower part to the upper part of the gantry 112. A positive Z axis direction may be from the rear part to the front part of the gantry 112 along an axis of a scanning channel. The gantry 111 may support the detector 112. A subject may be placed on the table 114 and moved into the detection region 113 for scanning along the Z axis as illustrated in FIG. 1. The detector 112 may detect radiation events (e.g., gamma photons) emitted from the detection region 113. In some embodiments, the detector 112 may include one or more detector units. The detector 112 may include a scintillation detector (e.g., a cesium iodide detector), a gas detector, etc. The detector 112 may be and/or include a single-row detector in which a plurality of detector units are arranged in a single row and/or a multi-row detector in which a plurality of detector units are arranged in multiple rows.

The processing device 120 may process data and/or information obtained from the imaging device 110, the storage device 130, and/or the terminal(s) 140. For example, the processing device 120 may obtain a motion signal (e.g., a respiratory signal) of a subject based on PET data of the subject. As another example, the processing device 120 may determine a distribution of motion cycles of a motion signal. As still another example, the processing device 120 may correct motion cycles of a motion signal based on a distribution of motion cycles of the motion signal to obtain corrected motion cycles. As still another example, the processing device 120 may reconstruct a PET image by gating PET data based on corrected motion cycles. As still another example, the processing device 120 may determine an envelope of a motion signal. The envelope of the motion signal may include a high frequency component and a low frequency component. As still another example, the processing device 120 may process an envelope of a motion signal by reducing a low frequency component to obtain a processed envelope of the motion signal. As still another example, the processing device 120 may determine a target motion signal by correcting, based on a processed envelope, amplitude information of a motion signal.

In some embodiments, the processing device 120 may be a single server or a server group. The server group may be centralized or distributed. In some embodiments, the processing device 120 may be local or remote. For example, the processing device 120 may access information and/or data from the imaging device 110, the storage device 130, and/or the terminal(s) 140 via the network 150. As another example, the processing device 120 may be directly connected to the imaging device 110, the terminal(s) 140, and/or the storage device 130 to access information and/or data. In some embodiments, the processing device 120 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 120 may be part of the terminal 140. In some embodiments, the processing device 120 may be part of the imaging device 110.

The storage device 130 may store data, instructions, and/or any other information. In some embodiments, the storage device 130 may store data obtained from the imaging device 110, the processing device 120, and/or the terminal(s) 140. The data may include image data acquired by the processing device 120, algorithms and/or models for processing the image data, etc. For example, the storage device 130 may store PET data of a subject obtained from a PET device (e.g., the imaging device 110). As another example, the storage device 130 may store a motion signal determined by the processing device 120. As still another example, the storage device 130 may store a distribution of motion cycles of a motion signal determined by the processing device 120. As still another example, the storage device 130 may store a corrected motion signal determined by the processing device 120. In some embodiments, the storage device 130 may store data and/or instructions that the processing device 120 and/or the terminal 140 may execute or use to perform exemplary methods described in the present disclosure. In some embodiments, the storage device 130 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memories may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 150 to communicate with one or more other components in the Imaging system 100 (e.g., the processing device 120, the terminal(s) 140). One or more components in the Imaging system 100 may access the data or instructions stored in the storage device 130 via the network 150. In some embodiments, the storage device 130 may be integrated into the Imaging device 110.

The terminal(s) 140 may be connected to and/or communicate with the Imaging device 110, the processing device 120, and/or the storage device 130. In some embodiments, the terminal 140 may include a mobile device 141, a tablet computer 142, a laptop computer 143, or the like, or any combination thereof. For example, the mobile device 141 may include a mobile phone, a personal digital assistant (PDA), a gaming device, a navigation device, a point of sale (POS) device, a laptop, a tablet computer, a desktop, or the like, or any combination thereof. In some embodiments, the terminal 140 may include an input device, an output device, etc. The input device may include alphanumeric and other keys that may be input via a keyboard, a touchscreen (for example, with haptics or tactile feedback), a speech input, an eye tracking input, a brain monitoring system, or any other comparable input mechanism. Other types of the input device may include a cursor control device, such as a mouse, a trackball, or cursor direction keys, etc. The output device may include a display, a printer, or the like, or any combination thereof.

The network 150 may include any suitable network that can facilitate the exchange of information and/or data for the imaging system 100. In some embodiments, one or more components of the imaging system 100 (e.g., the imaging device 110, the processing device 120, the storage device 130, the terminal(s) 140, etc.) may communicate information and/or data with one or more other components of the imaging system 100 via the network 150. For example, the processing device 120 and/or the terminal 140 may obtain PET data from the imaging device 110 via the network 150. As another example, the processing device 120 and/or the terminal 140 may obtain information stored in the storage device 130 via the network 150. The network 150 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network (VPN), a satellite network, a telephone network, routers, hubs, witches, server computers, and/or any combination thereof. For example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the Imaging system 100 may be connected to the network 150 to exchange data and/or information.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure.

Figure 2:
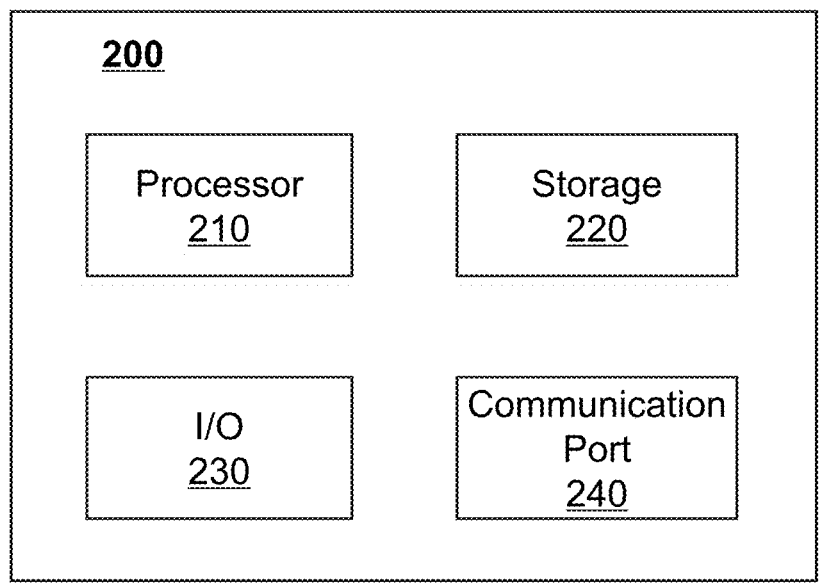
FIG. 2 is a schematic diagram illustrating exemplary hardware and/or software components of an exemplary computing device on which the processing device may be implemented according to some embodiments of the present disclosure.

FIG. 2 is a schematic diagram illustrating exemplary hardware and/or software components of an exemplary computing device 200 on which the processing device 120 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (e.g., program code) and perform functions of the processing device 120 in accordance with techniques described herein. The computer instructions may include, for example, routines, programs, objects, components, data structures, procedures, modules, and functions, which perform particular functions described herein. For example, the processor 210 may process imaging data obtained from the imaging device 110, the terminal(s) 140, the storage device 130, and/or any other component of the Imaging system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combination thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage 220 may store data/information obtained from the imaging device 110, the terminal(s) 140, the storage device 130, and/or any other component of the Imaging system 100. The storage 220 may be similar to the storage device 130 described in connection with FIG. 1, and the detailed descriptions are not repeated here.

The I/O 230 may input and/or output signals, data, information, etc. In some embodiments, the I/O 230 may enable a user interaction with the processing device 120. In some embodiments, the I/O 230 may include an input device and an output device. Examples of the input device may include a keyboard, a mouse, a touchscreen, a microphone, a sound recording device, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touchscreen, or the like, or a combination thereof.

The communication port 240 may be connected to a network (e.g., the network 150) to facilitate data communications. The communication port 240 may establish connections between the processing device 120 and the imaging device 110, the terminal(s) 140, and/or the storage device 130. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or any combination thereof. In some embodiments, the communication port 240 may be and/or include a standardized communication port, such as RS232, RS485. In some embodiments, the communication port 240 may be a specially designed communication port. For example, the communication port 240 may be designed in accordance with the digital imaging and communications in medicine (DICOM) protocol.

Figure 3:
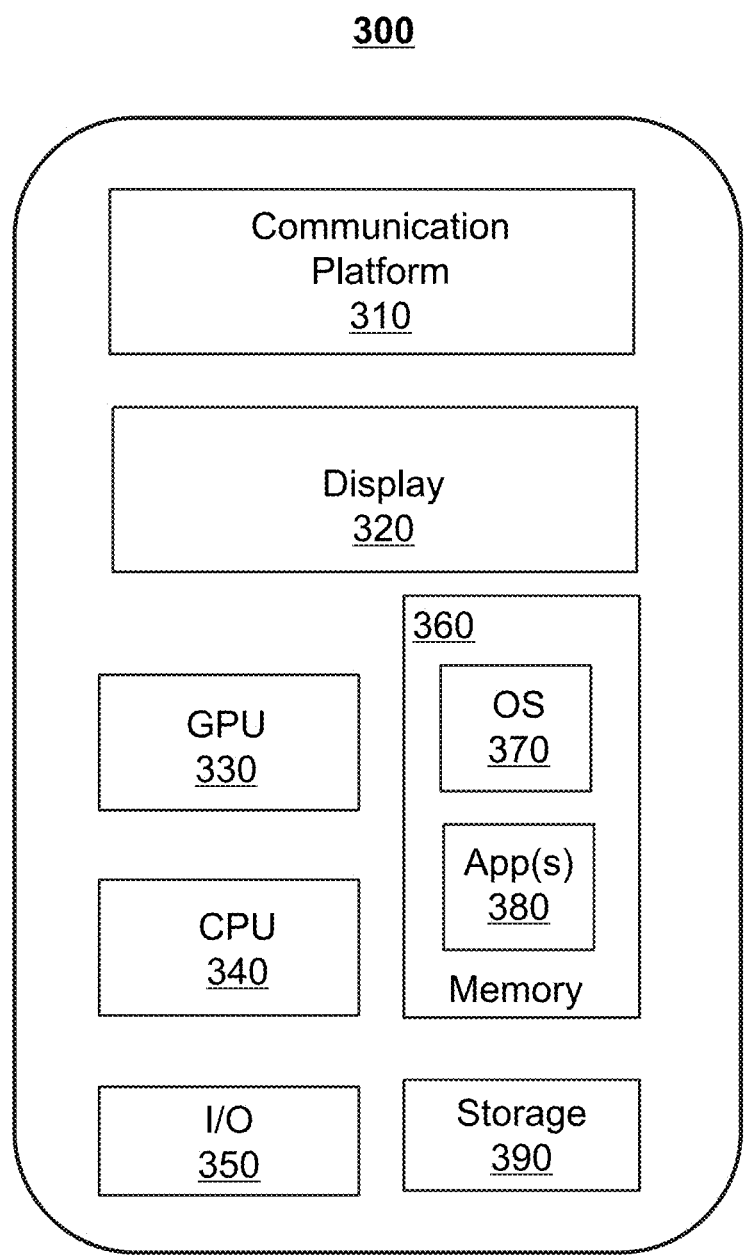
FIG. 3 is a schematic diagram illustrating exemplary hardware and/or software components of an exemplary mobile device on which the terminal(s) may be implemented according to some embodiments of the present disclosure.

FIG. 3 is a schematic diagram illustrating exemplary hardware and/or software components of an exemplary mobile device 300 on which the terminal(s) 140 may be implemented according to some embodiments of the present disclosure.

As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, the communication platform 310 may be configured to establish a connection between the mobile device 300 and other components of the imaging system 100, and enable data and/or signal to be transmitted between the mobile device 300 and other components of the imaging system 100. For example, the communication platform 310 may establish a wireless connection between the mobile device 300 and the imaging device 110, and/or the processing device 120. The wireless connection may include, for example, a Bluetooth™ link, a Wi-Fi™ link, a WiMax™ link, a WLAN link, a ZigBee link, a mobile network link (e.g., 3G, 4G, 5G), or the like, or any combination thereof. The communication platform 310 may also enable the data and/or signal between the mobile device 300 and other components of the imaging system 100. For example, the communication platform 310 may transmit data and/or signals inputted by a user to other components of the imaging system 100. The inputted data and/or signals may include a user instruction. As another example, the communication platform 310 may receive data and/or signals transmitted from the processing device 120. The received data and/or signals may include imaging data acquired by a detector of the imaging device 110.

In some embodiments, a mobile operating system (OS) 370 (e.g., iOS™ Android™, Windows Phone™, etc.) and one or more applications (App(s)) 380 may be loaded into the memory 360 from the storage 390 in order to be executed by the CPU 340. The applications 380 may include a browser or any other suitable mobile apps for receiving and rendering information respect to motion signal recalibration or other information from the processing device 120. User interactions with the information stream may be achieved via the I/O 350 and provided to the processing device 120 and/or other components of the Imaging system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result the drawings should be self-explanatory.

Figure 4A:
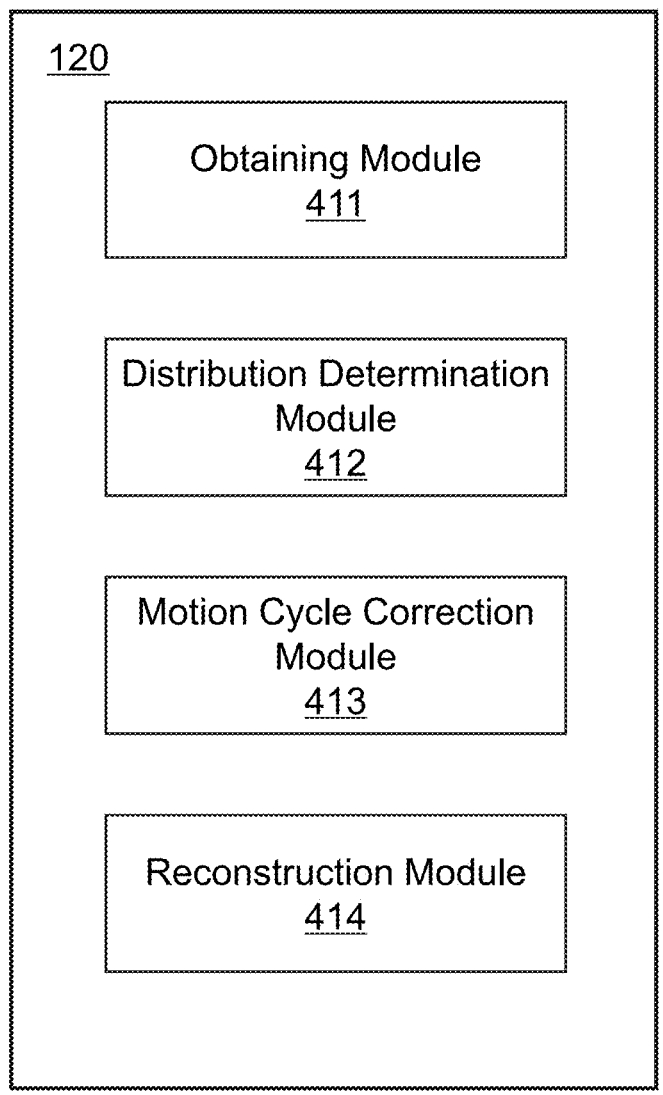
FIG. 4A is a schematic diagram illustrating an exemplary processing device according to some embodiments of the present disclosure.

FIG. 4A is a schematic diagram illustrating an exemplary processing device according to some embodiments of the present disclosure. In some embodiments, the processing device 120 may include an obtaining module 411, a distribution determination module 412, a motion cycle correction module 413, and a reconstruction module 414. The modules may be hardware circuits of at least part of the processing device 120. The modules may also be implemented as an application or set of instructions read and executed by the processing device 120. Further, the modules may be any combination of the hardware circuits and the application/instructions. For example, the modules may be part of the processing device 120 when the processing device 120 is executing the application or set of instructions.

The obtaining module 411 may be configured to obtain a motion signal of a subject. In some embodiments, the obtaining module 411 may acquire a motion signal based on PET data generated from a subject or a portion of the subject. For example, the obtaining module 411 may extract a respiratory signal from PET data based on a data-driven technique. Exemplary data-driven techniques may include an approach based on a center of mass, an approach based on counts levels, an approach of a principal component analysis, an approach based on VOI, or the like, or any combination thereof. In some embodiments, the obtaining module 411 may acquire a motion signal during or after the scanning, and/or before image reconstruction. More descriptions for obtaining a motion signal may be found elsewhere in the present disclosure (e.g., operation 510 in FIG. 5, and descriptions thereof).

The distribution determination module 412 may be configured to determine a distribution of motion cycles of a motion signal. The distribution of the motion cycles may indicate a probability that each motion cycle of a plurality of motion cycles in a motion signal corresponds to an actual motion cycle. In some embodiments, the distribution determination module 412 may determine a plurality of respiratory cycles based on the respiratory signal. The distribution determination module 412 may determine a first distribution of the respiratory cycles based on the plurality of respiratory cycles. The first distribution may include an average respiratory cycle, a variance of the respiratory cycles, a skewness of the first distribution, or the like. In some embodiments, the distribution determination module 412 may determine a plurality of half respiratory cycles based on the respiratory signal. The distribution determination module 412 may determine a second distribution of the half respiratory cycles based on the plurality of half respiratory cycles. The second distribution may include an average half respiratory cycle, a variance of the half respiratory cycles, a skewness of the second distribution, or the like. More descriptions for determining the first distribution and the second distribution may be found elsewhere in the present disclosure (e.g., operation 520 in FIG. 5, and descriptions thereof).

The motion cycle correction module 413 may be configured to correct motion cycles of a motion signal. In some embodiments, the motion cycle correction module 413 may correct motion cycles of a motion signal based on a distribution of motion cycles of the motion signal (e.g., a first distribution of the respiratory cycles, a second distribution of the half respiratory cycles). For example, for each peak of the plurality of peaks of the respiratory signal, the motion cycle correction module 413 may determine a first duration between the peak and a corresponding valley, a second duration between the peak and a next peak, and a third duration between the peak and a valley next to the corresponding valley. The motion cycle correction module 413 may determine a probability that each of the first duration, the second duration, and the third duration corresponds to an actual respiratory cycle based on a first distribution of the respiratory cycles and/or the second distribution of the half respiratory cycles. The motion cycle correction module 413 may determine the first duration, the second duration, or the third duration that has a maximum probability as the duration corresponding to the actual respiratory cycle. The motion cycle correction module 413 may correct the respiratory cycles of the respiratory signal based on the duration corresponding to the actual respiratory cycle. More descriptions for correcting motion cycles of a motion signal may be found elsewhere in the present disclosure (e.g., operation 530 in FIG. 5, and descriptions thereof).

The reconstruction module 414 may be configured to reconstruct a PET image. In some embodiments, the reconstruction module 414 may gate PET data according to a corrected motion signal (e.g., a corrected respiration signal) of a subject. In some embodiments, the reconstruction module 414 may divide a corrected respiratory signal into a plurality of respiratory phases based on the time of the corrected respiratory signal. In some embodiments, the reconstruction module 414 may divide a corrected respiratory signal into a plurality of respiratory phases based on amplitude information of the corrected respiratory signal. In some embodiments, the reconstruction module 414 may determine a plurality of groups (or referred to as frames) of gated PET data corresponding to a plurality of respiratory phases. In some embodiments, the reconstruction module 414 may reconstruct a plurality of gated PET images based on gated PET data corresponding to a plurality of respiratory phases. In some embodiments, the reconstruction module 414 may use a reconstruction algorithm to reconstruct a gated PET image. More descriptions for reconstructing a PET image may be found elsewhere in the present disclosure (e.g., operation 540 in FIG. 5, operation 650 in FIG. 6, and descriptions thereof).

It should be noted that the above description of the processing device 120 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more modules may be combined into a single module. For example, the distribution determination module 412 and the motion cycle correction module 413 may be combined into a single module, which may both determine a distribution of motion cycles of a motion signal, and correct the motion cycles of the motion signal. In some embodiments, one or more modules may be added or omitted in the processing device 120. For example, the processing device 120 may further include a storage module (not shown in FIG. 4A) configured to store data and/or information (e.g., PET data, a motion signal, a distribution of motion cycles, a PET image) associated with the imaging system 100. As another example, the processing device 120 may further include an envelope determination module (e.g., an envelope determination module 422), a processing module (e.g., a processing module 423), an amplitude information correction module (e.g., an amplitude information correction module 422), as described elsewhere in the present disclosure (e.g., FIG. 4B and descriptions thereof).

Figure 4B:
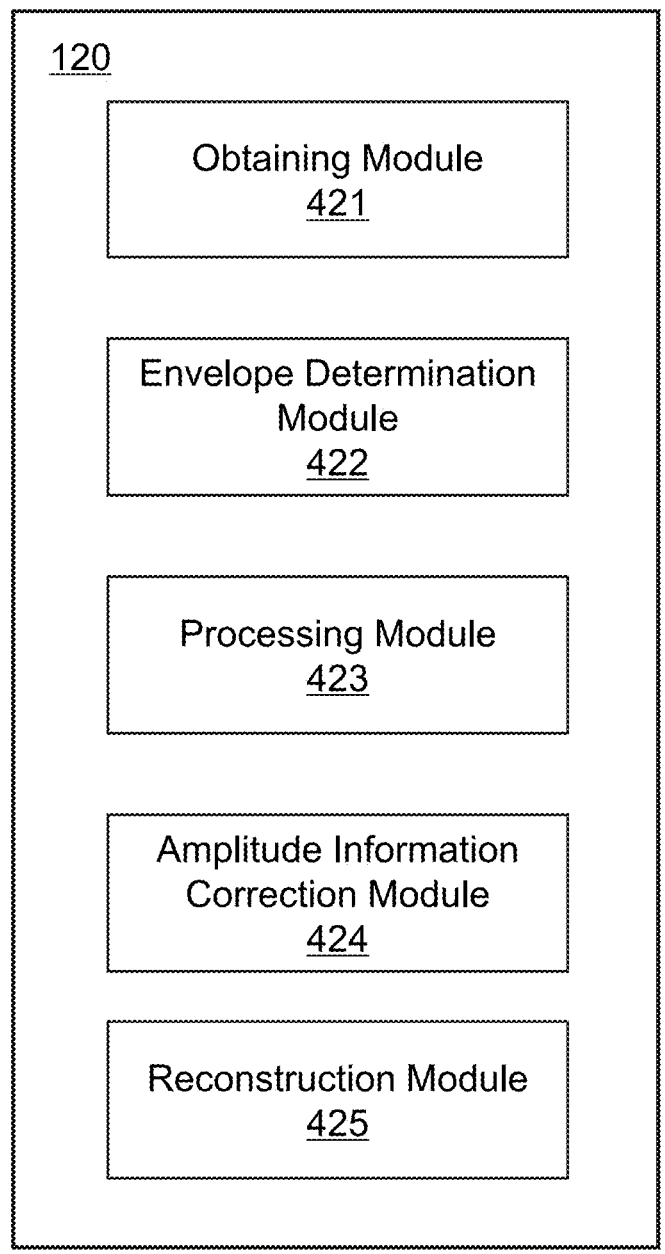
FIG. 4B is a schematic diagram illustrating an exemplary processing device according to some embodiments of the present disclosure.

FIG. 4B is a schematic diagram illustrating an exemplary processing device according to some embodiments of the present disclosure. In some embodiments, the processing device 120 may include an obtaining module 421, an envelope determination module 422, a processing module 423, an amplitude information correction module 422, and a reconstruction module 414. The modules may be hardware circuits of at least part of the processing device 120. The modules may also be implemented as an application or set of instructions read and executed by the processing device 120. Further, the modules may be any combination of the hardware circuits and the application/instructions. For example, the modules may be part of the processing device 120 when the processing device 120 is executing the application or set of instructions.

The obtaining module 421 may be configured to obtain a motion signal of a subject. In some embodiments, the obtaining module 421 may acquire a motion signal based on PET data generated from a subject or a portion of the subject. For example, the obtaining module 411 may extract a respiratory signal from PET data based on a data-driven technique. Exemplary data-driven techniques may include an approach based on a center of mass, an approach based on counts levels, an approach of a principal component analysis, an approach based on VOI, or the like, or any combination thereof. In some embodiments, the obtaining module 421 may acquire a motion signal during or after the scanning, and/or before image reconstruction. More descriptions for obtaining a motion signal may be found elsewhere in the present disclosure (e.g., operation 510 in FIG. 5, operation 610 in FIG. 6, and descriptions thereof).

The envelope determination module 422 may be configured to determine an envelope of a motion signal. In some embodiments, the envelope determination module 422 may determine an envelope of a motion signal by performing a Hilbert transformation on the motion signal. For example, the envelope determination module 422 may determine an analytic signal by performing the Hilbert transformation on the motion signal. The envelope determination module 422 may determine the envelope of the motion signal based on the analytic signal. In some embodiments, the envelope determination module 422 may determine an envelope of a motion signal by performing a moving-maximum operation on the motion signal. More descriptions for determining an envelope of a motion signal may be found elsewhere in the present disclosure (e.g., operation 620 in FIG. 6 and descriptions thereof).

The processing module 423 may be configured to process an envelope of a motion signal. In some embodiments, the processing module 423 may process an envelope of a motion signal by reducing a low frequency component of the envelope. For example, the processing module 423 may obtain the low frequency component by performing a low-pass filter on the envelope of the motion signal. The processing module 423 may reduce the low frequency component from the envelope of the motion signal. As another example, the processing module 423 may reduce the low frequency component by performing a high-pass filter on the envelope of the motion signal. More descriptions for processing an envelope of a motion signal may be found elsewhere in the present disclosure (e.g., operation 630 in FIG. 6 and descriptions thereof).

The amplitude information correction module 424 may be configured to determine a target motion signal by correcting, based on a processed envelope, amplitude information of a motion signal. In some embodiments, the amplitude information correction module 424 may correct amplitude information of a motion signal based on amplitude information of a processed envelope. For example, the amplitude information correction module 424 may determine an amplitude of a point in the processed envelope as an amplitude of a corresponding point (e.g., a corresponding peak, a corresponding valley) in the motion signal. More descriptions for determining a target motion signal may be found elsewhere in the present disclosure (e.g., operation 640 in FIG. 6 and descriptions thereof).

The reconstruction module 425 may be configured to reconstruct a PET image. In some embodiments, the reconstruction module 425 may gate PET data according to a corrected motion signal (e.g., a corrected respiration signal) of a subject. In some embodiments, the reconstruction module 425 may divide a corrected respiratory signal into a plurality of respiratory phases based on the time of the corrected respiratory signal. In some embodiments, the reconstruction module 425 may divide a corrected respiratory signal into a plurality of respiratory phases based on amplitude information of the corrected respiratory signal. In some embodiments, the reconstruction module 425 may determine a plurality of groups (or referred to as frames) of gated PET data corresponding to a plurality of respiratory phases. In some embodiments, the reconstruction module 425 may reconstruct a plurality of gated PET images based on gated PET data corresponding to a plurality of respiratory phases. In some embodiments, the reconstruction module 425 may use a reconstruction algorithm to reconstruct a gated PET image. More descriptions for reconstructing a PET image may be found elsewhere in the present disclosure (e.g., operation 540 in FIG. 5, operation 650 in FIG. 6, and descriptions thereof).

It should be noted that the above description of the processing device 120 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more modules may be combined into a single module. For example, the envelope determination module 422 and the processing module 423 may be combined into a single module, which may both determine an envelope of a motion signal, and process the envelope of the motion signal. In some embodiments, one or more modules may be added or omitted in the processing device 120. For example, the processing device 120 may further include a storage module (not shown in FIG. 4B) configured to store data and/or information (e.g., PET data, a motion signal, an envelope of the motion signal, a processed envelope of the motion signal, a PET image) associated with the imaging system 100.

Figure 5:
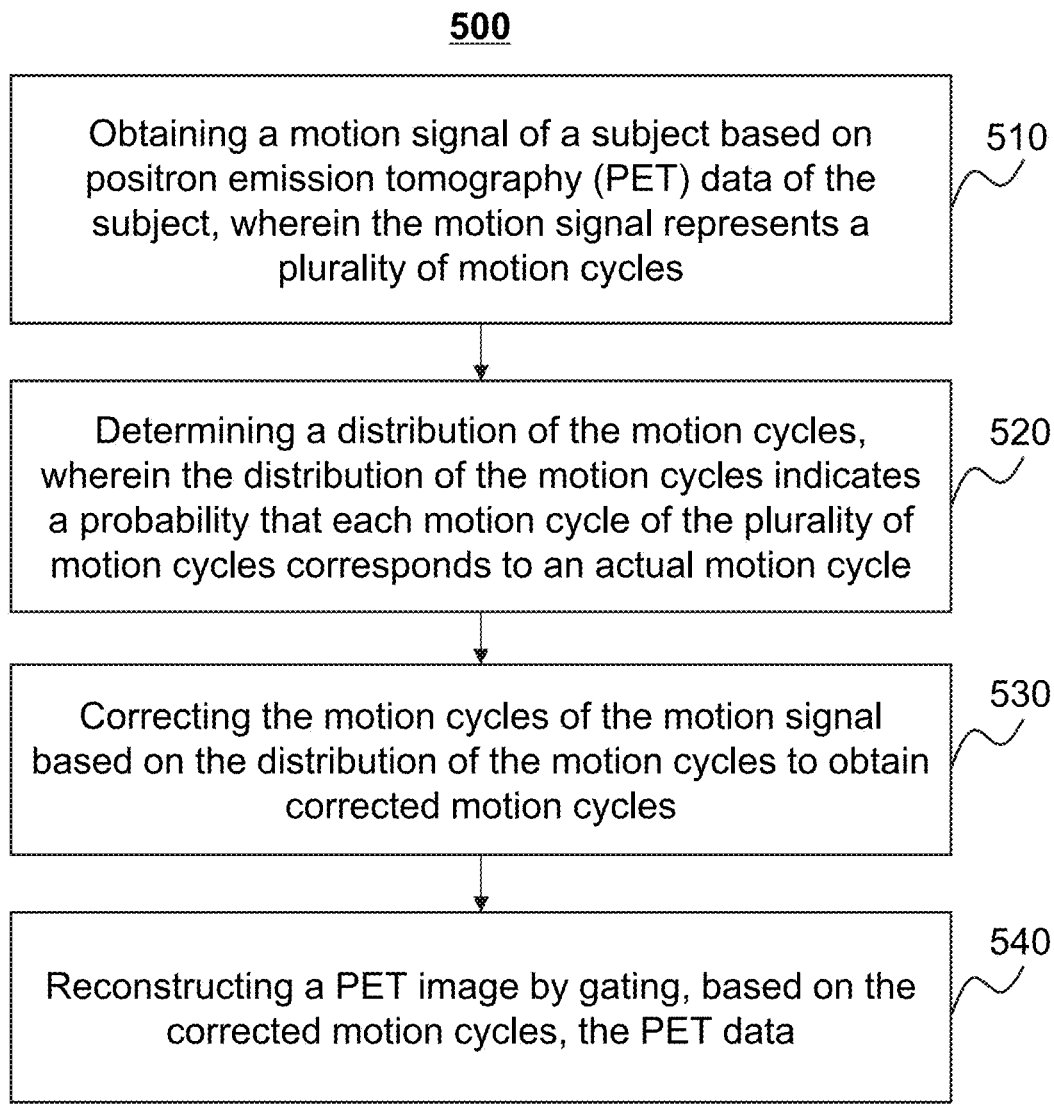
FIG. 5 is a flowchart illustrating an exemplary process for correcting motion cycles of a motion signal according to some embodiments of the present disclosure.

FIG. 5 is a flowchart illustrating an exemplary process for correcting motion cycles of a motion signal according to some embodiments of the present disclosure. In some embodiments, the process 500 may be implemented in the imaging system 100 illustrated in FIG. 1. For example, the process 500 may be stored in the storage device 130 and/or the storage (e.g., the storage 220, the storage 390) as a form of instructions, and invoked and/or executed by the processing device 120 (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 510, the processing device 120 (e.g., the obtaining module 411) may obtain a motion signal of a subject based on positron emission tomography (PET) data of the subject.

In some embodiments, the processing device 120 may obtain the PET data associated with the subject. In some embodiments, the PET data may be list-mode data or sinogram data. In some embodiments, during a PET scan or analysis, a PET tracer (also referred to as "PET tracer molecules" or "tracer") are first introduced into the subject before an imaging process begins. In some embodiments, the tracer concentration distribution in a subject's body (e.g., human body) may change dramatically within a time period (e.g., 60 seconds) right after the tracer is introduced into the subject's body (e.g., human body). In some embodiments, such a dramatic change sometimes makes it difficult to correctly determine motion signals or determine motion cycles, at least with un-corrected conventional approaches.

During the PET scan, the PET tracer molecules may emit positrons, namely the antiparticles of electrons. A positron has the same mass and the opposite electrical charge of an electron, and it undergoes an annihilation (also referred to as an "annihilation event" or a "coincidence event") with an electron (that may naturally exist in abundance within the subject) as the two particles collide. An electron-positron annihilation may result in two 511 keV gamma photons, which, upon their own generation, begin to travel in opposite directions with respect to one another. The line connecting the two gamma photons may be referred to as a "line of response (LOR)." The processing device 120 may obtain the trajectory and/or information (e.g., time) of the gamma photons (also referred to as the "PET data"). For example, the PET data may include a list of annihilation events, transverse and longitudinal positions of the LORs, or the like, or any combination thereof. In some embodiments, the PET data may be used to determine the locations and/or the concentration distribution of the PET tracer molecules within the subject.

In some embodiments, the processing device 120 may obtain the PET data from one or more components (e.g., the imaging device 110, the terminal 140, and/or the storage device 130) of the imaging system 100 or an external storage device via the network 150. For example, the imaging device 110 may transmit acquired PET data (e.g., projection data) to the storage device 130, or any other storage device for storage. The processing device 120 may obtain the PET data from the storage device 130, or any other storage device. As another example, the processing device 120 may obtain the PET data from the imaging device 110 directly. In some embodiments, the processing device 120 may obtain the PET data from the I/O 230 of the computing device 200 via the communication port 240, and/or the I/O 350 of the mobile device 300 via the communication platform 310. In some embodiments, the processing device 120 may obtain the PET data in real time—right when the data is being collected. In some embodiments, the processing device 120 may obtain the PET data (e.g., from a storage device) after data has been collected for a period of time.

The processing device 120 may determine the motion signal based on the PET data. In some embodiments, the subject may undergo a motion (e.g., a respiratory motion, a cardiac motion) during the PET scan. The motion signal may reflect a motion state of a subject. For example, a respiratory signal may reflect the motion of a tissue or an organ that is influenced by the respiratory motion of a subject. A cardiac motion signal may reflect the motion of the heart of a subject. In some embodiments, the processing device 120 may extract the respiratory signal from the PET data based on a data-driven technique. Exemplary data-driven techniques may include an approach based on a center of mass, an approach based on counts levels, an approach of a principal component analysis (PCA), or the like, or any combination thereof. For example, a coincidence counts versus time curve may be determined, thus providing an estimated respiratory signal. As another example, a center of mass of, for example, a distribution of PET tracers inside a VOI may be derived from the PET data. Then, a displacement of the center of mass as a function of time may provide a respiratory signal. As a further example, a principal component analysis (PCA) may be applied to the listmode PET data. Then, a respiratory signal may be obtained as the principal component weight factor whose frequency spectrum has the highest peak among the frequency band of a respiratory motion.

In some embodiments, the processing device 120 may determine the motion signal according to a volume of interest (VOI) based data-driven method. In some embodiments, the processing device 120 may determine a VOI based on the PET data. As used herein, the VOI may refer to a selected subset of the data according to a particular purpose. Different VOIs may be determined under different situations. In some embodiments, a specific VOI may be determined to detect the respiratory signal. For example, the VOI may be an area near the heart. As another example, the VOI may be an area near one or both lungs. In some embodiments, the VOI may include a three-dimensional volume, e.g., a sphere, a column, a block, or the like, or a combination thereof.

In some embodiments, the processing device 120 may determine the VOI based on the PET data and a time threshold. In some embodiments, the time threshold may be a default parameter stored in a storage device (e.g., the storage device 130). Additionally or alternatively, the time threshold may be set manually by a user of the imaging system 100, or determined by one or more components (e.g., the processing device 120) of the imaging system 100 according to different situations. For example, the time threshold may be determined based on user experience. As another example, the time threshold may be determined by performing a plurality of tracer kinetic experiments. In some embodiments, the time threshold may be related to a change of tracer concentration distribution in the subject over time. For example, the tracer concentration distribution in a human body may change dramatically within 30, 45 60, 75, or 90 seconds after the tracer is introduced into the human body. Accordingly, the time threshold may be set to 30, 45, 60, 75, or 90 seconds. In certain embodiments, the time threshold is set at 60 seconds.

In some embodiments, the processing device 120 may determine whether an acquisition time of the PET data is greater than the time threshold. In response to a determination that the acquisition time of the PET data is greater than the time threshold, the processing device 120 may delete a portion of the PET data acquired within the time threshold from the PET data, to generate target PET data. For illustration purposes, assuming that the acquisition time of the PET data is 180 seconds and the time threshold is 60 seconds, the processing device 120 may delete PET data acquired in the first 60 seconds. The processing device 120 may determine the PET data acquired in a time range from 60 seconds to 180 seconds as the target PET data. The processing device 120 may determine the motion signal based on the VOI and the PET data.

For example, the processing device 120 may determine a plurality of VOI parameters to identify a shape and/or a location of a VOI. As used herein, VOI parameters may include, for example, the parameters to identify the shape, volume, position of a VOI. The processing device 120 may determine a weighted signal indicating the movement of center of mass (COM) based on the PET data and the parametrized VOI. The processing device 120 may perform a Fourier spectrum analysis on the weighted signals to determine a signal quality indicator (SQI). As used herein, the signal quality indicator may refer to the signal-noise-ratio, which compares the energy level of a target signal within a physiological spectrum to the energy level of the target signal outside of the physiological spectrum. The processing device 120 may maximize the SQI for a given VOI by traversing the set of VOI parameters. The processing device 120 may determine a characteristic VOI with the maximized SQI. The processing device 120 may determine the motion signal based on the characteristic VOI. Exemplary techniques for determining the motion signal based on the VOI may be found, for example, in PCT Application No. PCT/CN2016/092413 filed Jul. 29, 2016, entitled "SYSTEMS AND METHODS FOR RECONSTRUCTING ECT IMAGE," the contents of which are hereby incorporated by reference.

In response to a determination that the acquisition time of the PET data is less than or equal to the time threshold, the processing device 120 may determine the VOI based on historical data. For example, the processing device 120 may obtain identification information of the subject. The identification information of the subject may include an identification (ID) number of the subject, a name of the subject, the gender of the subject, the age of the subject, a portion of the subject to be imaged, or the like, or any combination thereof. The processing device 120 may select a VOI from a plurality of historical VOIs based on the identification information of the subject. The user identification information associated with the selected VOI may be similar with the identification information of the subject. The processing device 120 may determine the selected VOI as the VOI of the subject.

In some embodiments, if the quality of the PET data is relatively poor due to a lesion of the subject is relatively small and/or the tracer concentration is relatively low, the time threshold may be set to 0 second. That is, the processing device 120 may not delete PET data and determine the VOI based on all acquired PET data.

In 520, the processing device 120 (e.g., the distribution determination module 412) may determine a distribution of motion cycles of the motion signal. The distribution of the motion cycles may indicate a probability that each motion cycle of a plurality of motion cycles in the motion signal corresponds to an actual motion cycle.

Figure 7A:
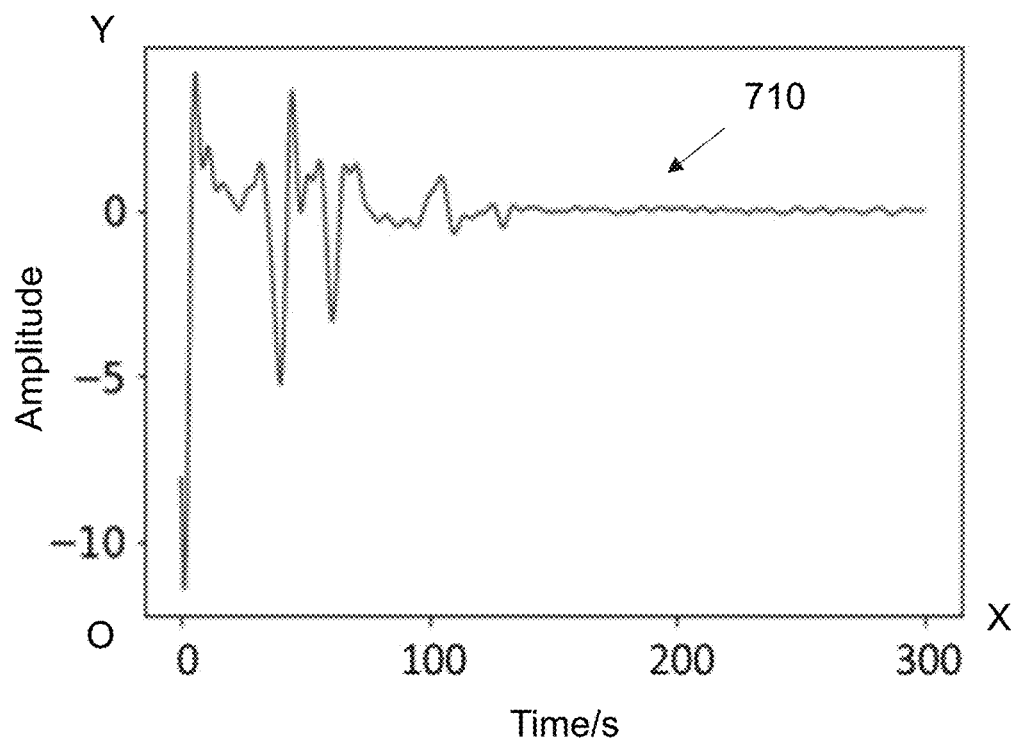
FIG. 7A illustrates an exemplary respiratory signal extracted using a conventional data-driven method.
Figure 7B:
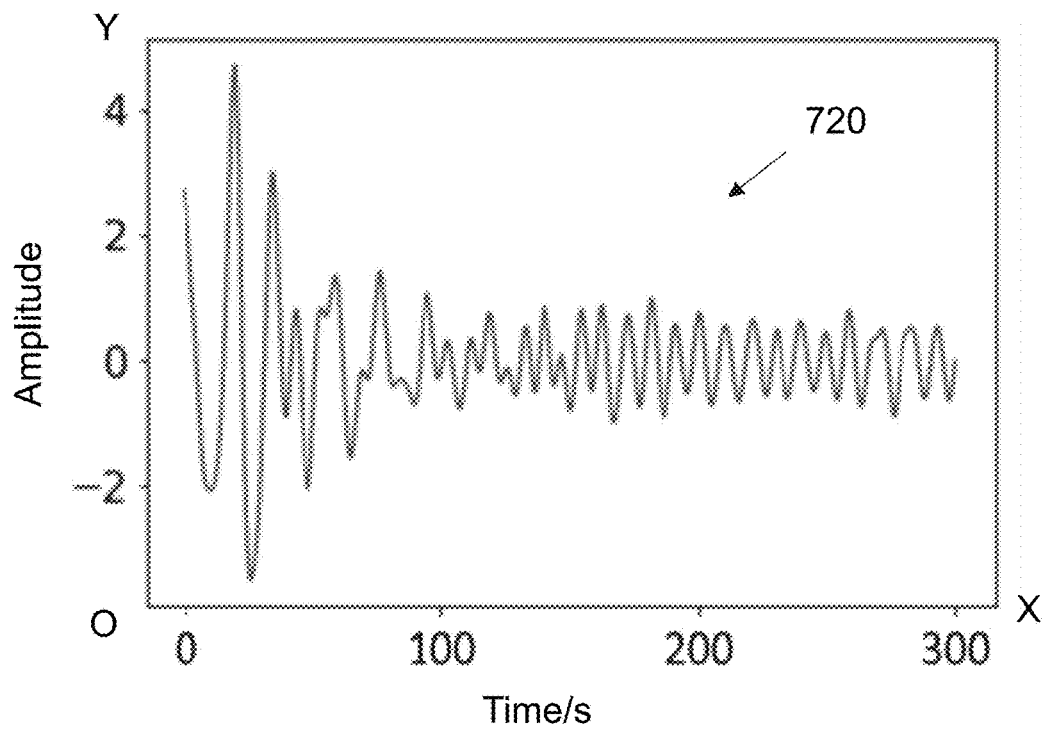
FIG. 7B illustrates an exemplary respiratory signal extracted using a VOI based data-driven method without the process of correction illustrated in the present disclosure.
Figure 7C:
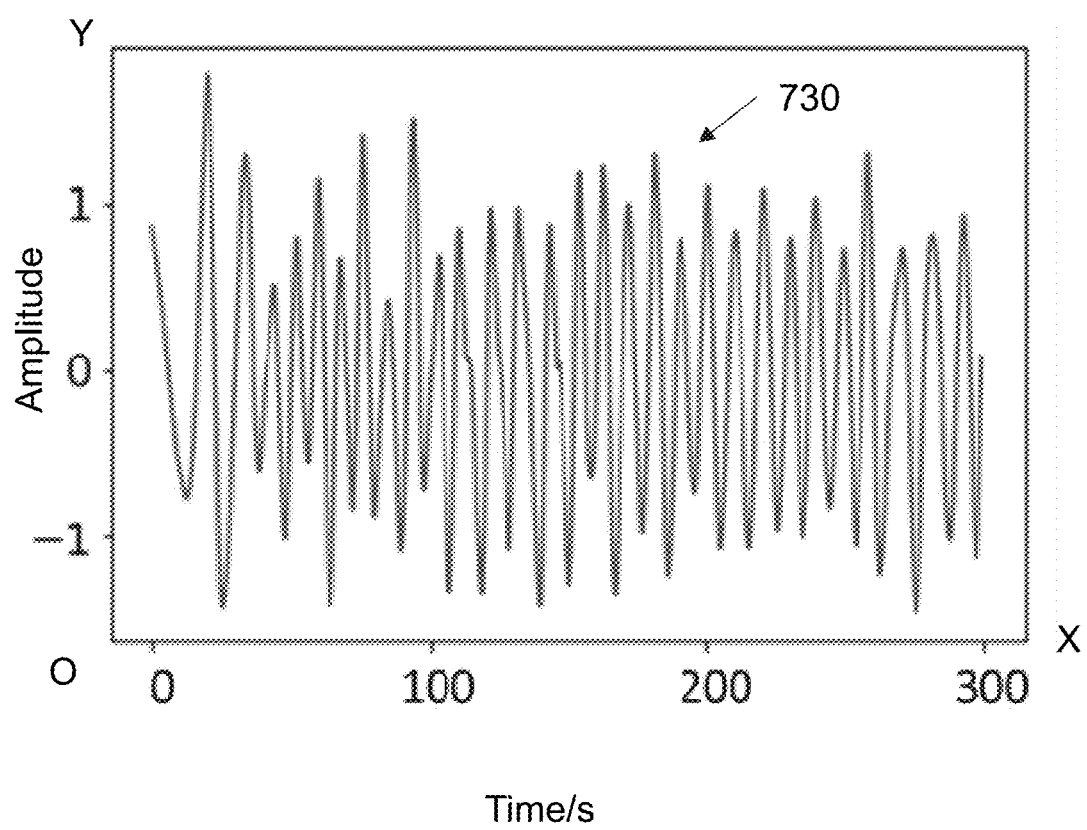
FIG. 7C illustrates an exemplary respiratory signal according to the process of correction illustrated in FIGS. 5 and 6 of the present disclosure.

In some embodiments, the motion signal (e.g., a respiratory signal) may be approximated by a sine function, a cosine function, a polynomial function, a pulse function, or the like, or any combination thereof. In some embodiments, the motion signal may be expressed in a two-dimensional coordinate system. The two-dimensional coordinate system may include a first coordinate axis (or the X axis) representing time, and a second coordinate axis (or the Y axis) representing amplitude. For example, a respiration signal may show the amplitude in the Y axis, and the amplitude may vary depending on the time in the X axis, as illustrated in FIGS. 7A-7C. In some embodiments, the amplitude of the respiratory signal may correspond to the displacement of a portion of an organ along a specific direction, e.g., the direction perpendicular to the coronal plane of a subject (e.g., a patient). In some embodiments, a time length of the respiratory signal may be equal to or less than the acquisition time of the PET data.

In some embodiments, the respiratory signal may include a plurality of peaks and a plurality of valleys. A respiratory cycle may include a duration between adjacent peaks or a duration between adjacent valleys. A half respiratory cycle may include a duration between a peak and a corresponding valley.

In some embodiments, the processing device 120 may determine a plurality of respiratory cycles based on the respiratory signal. For example, the processing device 120 may determine a plurality of durations between adjacent peaks (or adjacent valleys) in the respiratory signal as the plurality of respiratory cycles. The processing device 120 may determine a histogram of the plurality of respiratory cycles. In some embodiments, the horizontal axis of the histogram may represent a duration of a respiratory cycle, and the vertical axis of the histogram may represent a probability of the respiratory cycle. As used herein, a probability of a specific respiratory cycle may represent a ratio between the number of times a duration corresponding to the specific respiratory cycle occurs in the respiratory signal, and the total number of the plurality of respiratory cycles in the respiratory signal. In some embodiments, it is assumed that a relatively small portion of the respiratory signal is affected by the change of tracer concentration distribution in the subject, a specific respiratory cycle having a higher probability may indicate that the probability that a duration of the specific respiratory cycle corresponds to a duration of an actual respiratory cycle is higher.

The processing device 120 may determine a first distribution of the respiratory cycles based on the plurality of respiratory cycles. For example, the processing device 120 may perform a first model fitting on the plurality of respiratory cycles to generate a first model fitting curve. In some embodiments, the plurality of respiratory cycles in the respiratory signal associated with the subject (e.g., a patient) may satisfy a certain distribution. The distribution may be assumed as a Gaussian distribution, a pre-determined model based on population (e.g., a per-determined based on a larger patient database), or the like. Accordingly, the first model fitting may be performed based on a Gaussian model, a pre-determined model based on population, or the like. In some embodiments, assuming that the plurality of respiratory cycles in the respiratory signal associated with the subject (e.g., a patient) satisfies the Gaussian distribution, the processing device 120 may perform a Gaussian fitting on the plurality of respiratory cycles to generate a first Gaussian fitting curve. As used herein, a Gaussian (or normal) distribution refers to a type of continuous probability distribution for a real-valued random variable. For example, the processing device 120 may fit the Gaussian distribution to the histogram of the plurality of respiratory cycles to generate the first Gaussian fitting curve. In some embodiments, the processing device 120 may determine an average respiratory cycle, a variance of the respiratory cycles, a skewness of the first Gaussian fitting curve based on the first Gaussian fitting curve. For example, the processing device 120 may determine the average respiratory cycle based on the location of the center of the first Gaussian fitting curve. The processing device 120 may determine the variance of the respiratory cycles based on the height and the width of the first Gaussian fitting curve.

In some embodiments, the processing device 120 may determine a plurality of half respiratory cycles based on the respiratory signal. For example, the processing device 120 may determine a plurality of durations between a peak and a corresponding valley in the respiratory signal as the plurality of half respiratory cycles. The processing device 120 may determine a histogram of the plurality of half respiratory cycles. The processing device 120 may determine a second distribution of the half respiratory cycles based on the plurality of half respiratory cycles. For example, the processing device 120 may perform a second model fitting on the plurality of half respiratory cycles to generate a second model fitting curve. In some embodiments, the second model fitting may be performed based on a Gaussian model, a pre-determined model based on population, or the like.

In some embodiments, assuming that the plurality of half respiratory cycles in the respiratory signal associated with the subject (e.g., a patient) satisfies a Gaussian distribution, the processing device 120 may perform a Gaussian fitting on the plurality of half respiratory cycles to generate a second Gaussian fitting curve. For example, the processing device 120 may fit a Gaussian distribution to the histogram of the plurality of half respiratory cycles to generate the second Gaussian fitting curve. In some embodiments, the processing device 120 may determine an average half respiratory cycle, a variance of the half respiratory cycles, a skewness of the second Gaussian fitting curve based on the second Gaussian fitting curve. For example, the processing device 120 may determine the average half respiratory cycle based on the location of the center of the second Gaussian fitting curve. The processing device 120 may determine the variance of the half respiratory cycles based on the height and the width of the second Gaussian fitting curve.

In 530, the processing device 120 (e.g., the motion cycle correction module 413) may correct the motion cycles of the motion signal based on the distribution of the motion cycles to obtain corrected motion cycles.

In some embodiments, the respiration signal may correspond to a plurality of respiratory phases of the subject. In some embodiments, the respiratory phases of the subject (e.g., a patient) may include an intermediate inspiration phase, an end-inspiration phase, an intermediate expiration phase, an end-expiration phase, or the like, or any combination thereof. The intermediate inspiration phase and the end-inspiration phase may also referred to as an inspiration phase. The intermediate expiration phase and the end-expiration phase may also referred to as an expiration phase. For example, in the inspiration phase, the patient may expand his/her chest to cause a negative pressure in the chest. The negative pressure may cause the air to flow into the lungs of the patient. As another example, in the expiration phase, the patient may shrink the chest to cause a positive pressure in the chest. The positive pressure may push the air out of the lungs.

In some embodiments, in an actual respiratory cycle, the intermediate inspiration phase may be an ascending phase in the respiratory signal. The end-inspiration phase may be an end of the ascending phase in the respiratory signal, such as a peak of the respiratory signal. The intermediate expiration phase may be a descending phase in the respiratory signal. The end-expiration phase may be an end of the descending phase in the respiratory signal, such as a valley in the respiratory signal. That is, the actual respiratory cycle may refer to a duration from a first end-inspiration phase (or a first end-expiration phase) to a second end-inspiration phase (or a second end-expiration phase), and the amplitude of the respiratory signal in the actual respiratory cycle may decrease (or increase) from a highest value (or a lowest value) to a lowest value (or a highest value), and then increase (or decrease) to a highest value (or a lowest value).

In some embodiments, the tracer concentration distribution in a human body may change dramatically within a time period (e.g., 30 seconds, 60 seconds) after the tracer is introduced into the human body, and the sign of the respiratory signal obtained in the time period may be flipped. As used herein, "a respiratory signal is flipped" may refer to that the respiratory signal of a subject is opposite to an actual respiratory state of the subject. For example, if a respiratory signal is flipped, a valley of the respiratory signal may correspond to an end-expiration phase of the actual respiratory state, and a peak may correspond to an end-inspiration phase of the actual respiratory state. In some embodiments, "the respiratory signal is flipped" may refer to that every respiratory cycle of the respiratory signal is flipped. In some embodiments, "the respiratory signal is flipped" may refer to that part of the respiratory signal, including some of the respiratory cycles, are flipped. Accordingly, the respiratory cycles of the respiratory signal may need to be corrected to obtain corrected respiratory cycles.

In some embodiments, the processing device 120 may correct the respiratory cycles of the respiratory signal based on the distribution of the motion cycles. For example, the processing device 120 may correct the respiratory cycles of the respiratory signal according to a maximum likelihood estimation algorithm. In some embodiments, the processing device 120 may correct one respiratory cycle of the respiratory signal at one time. In some embodiments, for each peak of the plurality of peaks of the respiratory signal, the processing device 120 may determine a first duration between the peak and a corresponding valley, a second duration between the peak and a next peak, and a third duration between the peak and a valley next to the corresponding valley.

The processing device 120 may determine a probability that each of the first duration, second duration, and third durations corresponds to an actual respiratory cycle based on the first model fitting curve (e.g., the first Gaussian fitting curve), or the second model fitting curve (e.g., the second Gaussian fitting curve). In some embodiments, the processing device 120 may determine the probability that each of the first duration, second duration, and third durations corresponds to the actual respiratory cycle based on the first Gaussian fitting curve, the first duration, the second duration, and the third duration. For example, the processing device 120 may determine the probability that the first duration corresponds the actual respiratory cycle (also referred to as the probability of the first duration) based on the first Gaussian fitting curve and the first duration. Specifically, the processing device 120 may select a point with the horizontal axis coordinate (e.g., a X-axis coordinate) of a value of the first duration on the first Gaussian fitting curve. The processing device 120 may determine the vertical axis coordinate (e.g., a Y-axis coordinate) of the selected point as the probability of the first duration. Similarly, the processing device 120 may determine the probability that the second duration corresponds the actual respiratory cycle (also referred to as the probability of the second duration) and the third duration corresponds the actual respiratory cycle (also referred to as the probability of the third duration).

The processing device 120 may determine the first duration, the second duration, or the third duration that has a maximum probability as the duration corresponding to the actual respiratory cycle. The processing device 120 may correct the respiratory cycles of the respiratory signal based on the duration corresponding to the actual respiratory cycle. In some embodiments, the processing device 120 may flip one or more peaks and/or one or more valleys of the respiratory signal. For example, the processing device 120 may turn a peak of the respiratory signal down to generate a new valley. As another example, the processing device 120 may turn a valley of the respiratory signal upside to generate a new peak. Therefore, the peak of the corrected respiratory signal may correspond to an end-inspiration phase of the actual motion state, and the valley of the corrected respiratory signal may correspond to an end-expiration phase of the actual motion state.

For illustration purposes, assuming that a first duration between a first peak and a first valley is 4 second, a second duration between the first peak and a second peak is 8 seconds, a third duration between the first peak and a second valley is 10 seconds, a first probability of the first duration is 0.8, a second probability of the second duration is 0.5, and a third probability of the third duration is 0.2, the processing device 120 may determine the first duration between the first peak and the first valley as the actual respiratory cycle. That is, if the first peak is a first actual peak corresponding to an end-inspiration phase, the processing device 120 may determine that the first valley is a second actual peak corresponding to the end-inspiration phase. The processing device 120 may then turn the first valley upside to generate the second actual peak.

In some embodiments, the processing device 120 may correct two or more adjacent respiratory cycles of the respiratory signal at one time. For example, the processing device 120 may determine a plurality of combinations between a duration between adjacent peaks, a duration between adjacent valleys, a duration between a peak and a corresponding valley, a duration between a peak and a valley next to a corresponding valley of the peak, a duration between a valley and a next peak, a duration between a valley and a peak next to the next peak of the valley, in the respiratory signal. The processing device 120 may determine a probability that each combination corresponds to two or more adjacent actual respiratory cycles based on the first model fitting curve (e.g., the first Gaussian fitting curve), or the second model fitting curve (e.g., the second Gaussian fitting curve). The processing device may determine a combination that has a maximum probability as the duration corresponding to the two or more adjacent actual respiratory cycles. The processing device 120 may correct the respiratory cycles of the respiratory signal based on the duration corresponding to the two or more adjacent actual respiratory cycles.

For example, assuming that a respiratory signal includes a plurality of peaks (e.g., a first peak, a second peak, a third peak, a fourth peak, . . . , and a nth peak) and a plurality of valleys (e.g., a first valley, a second valley, a third valley, a fourth valley, . . . , and a nth valley), and the processing device 120 may correct two adjacent respiratory cycles of the respiratory signal at one time. The processing device 120 may determine that a first combination in the respiratory signal is a combination of a duration between the first peak and the first valley, and a duration between the first valley and the second peak. The processing device 120 may determine a first probability P1 that the first combination corresponds to two adjacent actual respiratory cycles. For example, the processing device 120 may determine a probability P11 that the duration between the first peak and the first valley corresponds to a first actual respiratory cycle, and a probability P12 that the duration between the first valley and the second peak corresponds to a second actual respiratory cycle. The processing device 120 may determine the first probability P by multiplying the probability P11 by the probability P12 (i.e., P1=P11×P12).

The processing device 120 may determine that a second combination in the respiratory signal is a combination of the duration between the first peak and the first valley, and a duration between the first valley and the second valley. The processing device 120 may determine a second probability P2 that the second combination corresponds to two adjacent actual respiratory cycles. For example, the processing device 120 may determine a probability P21 that the duration between the first peak and the first valley corresponds to a first actual respiratory cycle, and a probability P22 that the duration between the first valley and the second valley corresponds to a second actual respiratory cycle. The processing device 120 may determine the second probability P2 by multiplying the probability P21 by the probability P22 (i.e., P2=P21×P22).

Similarly, the processing device 120 may determine a plurality of combinations. For example, the processing device 120 may determine that a third combination in the respiratory signal is a combination of the duration between the first peak and the first valley, and a duration between the first valley and the third peak. The processing device 120 may determine that a fourth combination in the respiratory signal is a combination of a duration between the first peak and the second peak, and a duration between the second peak and the second valley. The processing device 120 may determine that a fifth combination in the respiratory signal is a combination of the duration between the first peak and the second peak, and a duration between the second peak and the third peak. The processing device 120 may determine that a sixth combination in the respiratory signal is a combination of the duration between the first peak and the second peak, and a duration between the second peak and the third valley. The processing device 120 may determine that a seventh combination in the respiratory signal is a combination of a duration between the first peak and the second valley, and a duration between the second valley and the third peak. The processing device 120 may determine that an eighth combination in the respiratory signal is a combination of the duration between the first peak and the second valley, and a duration between the second valley and the third valley. The processing device 120 may determine that a ninth combination in the respiratory signal is a combination of the duration between the first peak and the second valley, and a duration between the second valley and the fourth peak. The processing device 120 may determine a plurality of probabilities (e.g., P3, P4, P5, P6, P7, P8, P9)

corresponding to the plurality of combinations. The processing device 120 may determine a combination that has a maximum probability as the duration corresponding to the two adjacent actual respiratory cycle. The processing device 120 may correct the respiratory cycles of the respiratory signal based on the duration corresponding to the two adjacent actual respiratory cycles.

In 540, the processing device 120 (e.g., the reconstruction module 414) may reconstruct a PET image by gating the PET data based on the corrected motion cycles.

In some embodiments, the processing device 120 may reconstruct the PET image based on a gating approach. As used herein, a gating approach may refer to that PET data may be divided into a plurality of sections and one of the sections may be selected to be processed to generate a PET image.

In some embodiments, the processing device 120 may determine a corrected motion signal (e.g., a corrected respiration signal) based on the corrected motion cycles (e.g., corrected respiration cycles). In some embodiments, the processing device 120 may gate the PET data according to the corrected motion signal (e.g., the corrected respiration signal) of the subject. In some embodiments, the processing device 120 may divide the corrected respiratory signal into a plurality of respiratory phases based on the time of the corrected respiratory signal. In some embodiments, the processing device 120 may divide the corrected respiratory signal into N parts based on the time of the corrected respiratory signal, and the N parts may correspond to N respiratory phases. For example, if a respiratory cycle of the corrected respiratory signal lasts 5 seconds, a respiratory cycle of the corrected respiratory signal may be divided according to a time interval (e.g., 0.5 seconds, or 1 second), and this respiratory cycle of the corrected respiratory signal may be divided into N respiratory phases (e.g., 5/0.5 or 10 respiratory phases, or 5/1 or 5 respiratory phases).

In some embodiments, the processing device 120 may also determine a plurality of groups (or referred to as frames) of gated PET data corresponding to the plurality of respiratory phases. For example, the corrected respiratory signal may correspond to N respiratory phases, and the processing device 120 may gate the PET data into N groups (or frames) of gated PET data based on the N respiratory phases. Each group of gated PET data may correspond to a respiratory phase.

In some embodiments, the processing device 120 may reconstruct a plurality of gated PET images based on the gated PET data corresponding to the respiratory phases. In some embodiments, the processing device 120 may reconstruct a gated PET image for each respiratory phase based on the corresponding group of gated PET data. In some embodiments, the processing device 120 may reconstruct one or more gated PET image for a portion of respiratory phases according to different situations. For example, the processing device 120 may reconstruct a gated PET image corresponding to an intermediate inspiration phase.

In some embodiments, the processing device 120 may use a reconstruction algorithm to reconstruct a gated PET image. Exemplary reconstruction algorithms may include a maximum-likelihood reconstruction of attenuation and activity (MLAA) algorithm, an iterative reconstruction algorithm (e.g., a statistical reconstruction algorithm), a Fourier slice theorem algorithm, a filtered back projection (FBP) algorithm, a compressed sensing (CS) algorithm, a fan-beam reconstruction algorithm, a maximum likelihood expectation maximization (MLEM) algorithm, an ordered subset expectation maximization (OSEM) algorithm, a maximum a posteriori (MAP) algorithm, an analytic reconstruction algorithm, or the like, or any combination thereof.

In some embodiments, the processing device 120 may correct a gated PET image based on one or more correction techniques. Exemplary correction techniques may include a random correction technique, a scatter correction technique, a dead time correction technique, or the like, or any combination thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added. For example, an operation for correcting amplitude information of the motion signal may be added after operation 530. More descriptions for correcting amplitude information of the motion signal may be found elsewhere in the present disclosure (e.g., FIG. 6 and descriptions thereof).

Figure 6:
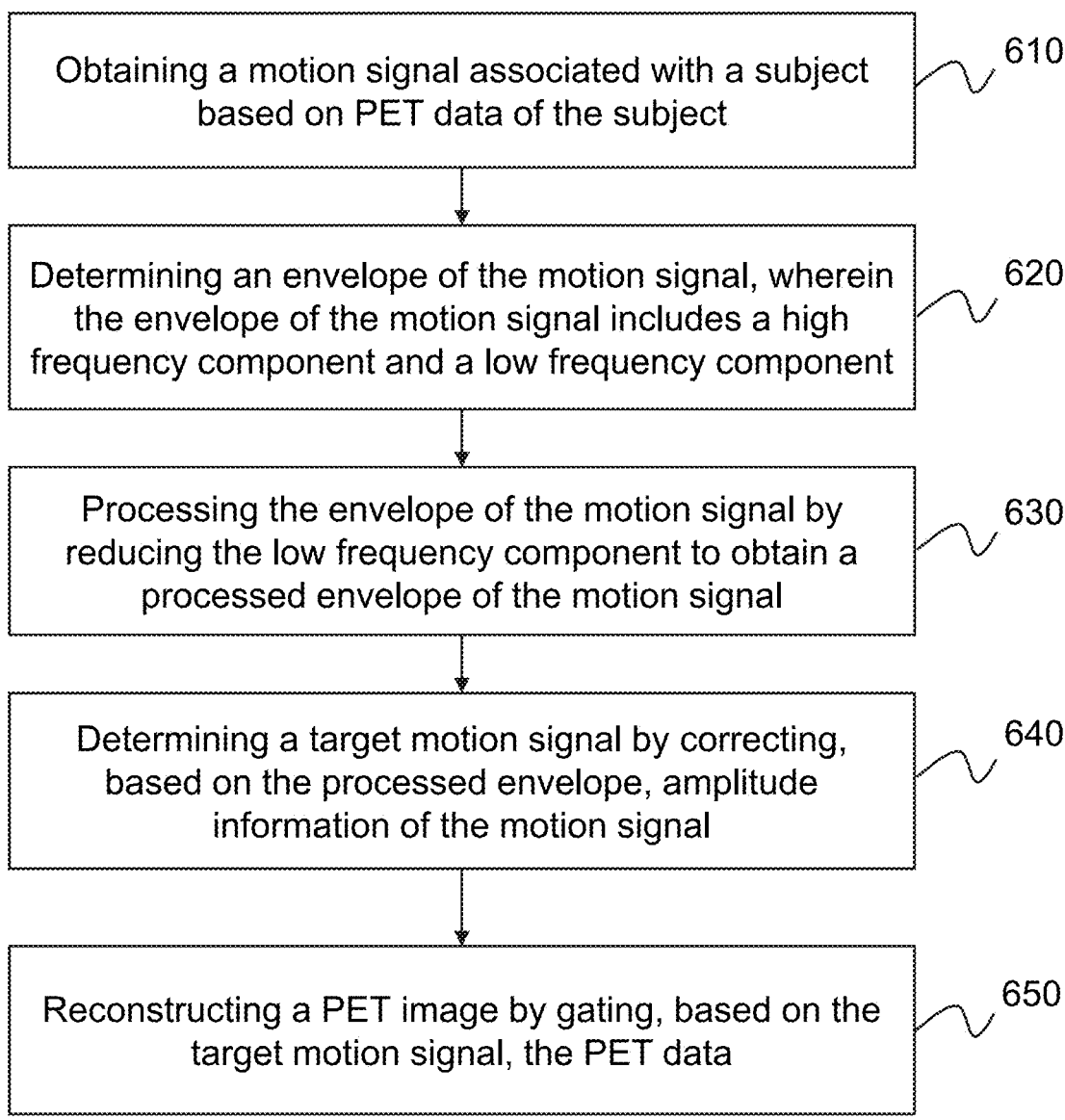
FIG. 6 is a flowchart illustrating an exemplary process for correcting amplitude information of a motion signal according to some embodiments of the present disclosure.

FIG. 6 is a flowchart illustrating an exemplary process for correcting amplitude information of a motion signal according to some embodiments of the present disclosure. In some embodiments, the process 600 may be implemented in the imaging system 100 illustrated in FIG. 1. For example, the process 600 may be stored in the storage device 130 and/or the storage (e.g., the storage 220, the storage 390) as a form of instructions, and invoked and/or executed by the processing device 120 (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting.

In 610, the processing device 120 (e.g., the obtaining module 421) may obtain a motion signal of a subject based on positron emission tomography (PET) data of the subject. More descriptions of the obtaining of the motion signal may be found elsewhere in the present disclosure (e.g., operation 510 in FIG. 5, and descriptions thereof).

In 620, the processing device 120 (e.g., the envelope determination module 422) may determine an envelope of the motion signal.

As used herein, an envelope of a signal may refer to a smooth curve outlining its extremes. In some embodiments, the envelope of the motion signal may be a smooth curve connecting all peaks of the motion signal. That is, the envelope of the motion signal may reflect an amplitude change of all peaks of the motion signal. In some embodiments, the envelope of the motion signal may be a smooth curve connecting all valleys of the motion signal. That is, the envelope of the motion signal may reflect an amplitude change of all the valleys of the motion signal.

In some embodiments, the processing device 120 may determine the envelope of the motion signal by performing a Hilbert transformation on the motion signal. As used herein, the Hilbert transformation may refer to a specific linear operator that takes a function, u(t) of a real variable and produces another function of a real variable H(u)(t). In some embodiments, the processing device 120 may determine an analytic signal by performing the Hilbert transformation on the motion signal. As used herein, an analytic signal may refer to a complex-valued function that has no negative frequency components. The processing device 120 may determine the envelope of the motion signal based on the analytic signal. For example, the processing device 120 may determine an amplitude of the analytic signal as the envelope of the motion signal.

In some embodiments, the processing device 120 may determine the envelope of the motion signal by performing a moving-maximum operation on the motion signal. For example, a moving window may slide over the motion signal. The processing device 120 may determine a maximum value in the moving window. The processing device 120 may determine the envelope of the motion signal by performing an interpolation operation on a plurality of maximum values in a plurality of moving windows. In some embodiments, a width of the moving window may be set manually by a user of the imaging system 100, or determined by one or more components (e.g., the processing device 120) of the imaging system 100 according to different situations. In some embodiments, the width of the moving window may be 3 seconds, 5 seconds, 8 seconds, or the like.

In some embodiments, the envelope of the motion signal may include a high frequency component and a low frequency component. In some embodiments, an amplitude change rate of the high frequency component may be less than a threshold, and an amplitude change rate of the low frequency component may be greater than the threshold. As used herein, an amplitude change rate may reflect a duration of an amplitude change. The amplitude change rate of the high frequency component is less than the threshold (e.g., 20 seconds) may indicate that the amplitude of the high frequency component changes faster than the threshold (e.g., 20 seconds). For example, the amplitude of the high frequency component may be changed for 10 seconds, that is, the amplitude of the high frequency component may be continuously increased (or decreased) from 0 to 10 seconds. The amplitude change rate of the low frequency component is greater than the threshold (e.g., 20 seconds) may indicate that the amplitude of the low frequency component changes slower than the threshold (e.g., 20 seconds). For example, the amplitude of the low frequency component may be changed for 30 seconds, that is, the amplitude of the low frequency component may be continuously increased (or decreased) from 0 to 30 seconds.

In some embodiments, the threshold may be default parameter stored in a storage device (e.g., the storage device 150). In some embodiments, the threshold may be set manually by a user of the imaging system 100, or determined by one or more components (e.g., the processing device 120) of the imaging system 100 according to different situations. For example, the threshold may be determined based on user experience. As another example, the threshold may be determined based on a plurality of experimental results. In some embodiments, the threshold may be related to the time that a dynamic distribution of the tracer concentration in the subject affects the respiratory motion of the subject. For example, assuming that the dynamic distribution of the tracer concentration in the subject affects the respiratory motion of the subject for more than 20 seconds, the threshold may be set to 20 seconds. That is, the low frequency component may reflect the amplitude change in the respiratory signal of the subject caused by the dynamic distribution of the tracer concentration in the subject. The high frequency component may reflect the actual amplitude change in the respiratory signal of the subject.

In 630, the processing device 120 (e.g., the processing module 423) may process the envelope of the motion signal by reducing the low frequency component to obtain a processed envelope of the motion signal.

In some embodiments, the processing device 120 may obtain the low frequency component by performing a low-pass filter on the envelope of the motion signal. The processing device 120 may reduce the low frequency component from the envelope of the motion signal. As used herein, a low-pass filter may be a filter that passes signals with a frequency lower than a certain cutoff frequency and attenuates signals with frequencies higher than the cutoff frequency. In some embodiments, the cutoff frequency may be the threshold described in operation 620. In some embodiments, the low-pass filters may include a moving average filter, an ideal low-pass filter, a Butterworth low-pass filter, a Gaussian low-pass filter, or the like, or any combination thereof. The moving average filter may include a simple moving average filter, a cumulative moving average filter, a weighted moving average filter, or the like, or any combination thereof.

In some embodiments, the processing device 120 may obtain the low frequency component by performing a simple moving average filter on the envelope of the motion signal. In some embodiments, the simple moving average filter may be used to run through a signal point by point, and a value (e.g., an amplitude value) of a specific point may be replaced (or updated) with an average value (e.g., a mean value) of a plurality of neighboring points of the specific point. In some embodiments, the simple moving average filter may have a filter window. As used herein, a filter window may refer to a selection pattern for picking up neighboring elements (e.g., neighboring points) around an element (e.g., a point) to be processed in a signal (e.g., the envelope). For example, the simple moving average filter may perform a same or similar action for each element in a signal (e.g., each point in the envelope) based on multiple neighboring elements (e.g., multiple neighboring points) of the each element in the filter window. In some embodiments, the filter window may slide over the signal (e.g., the envelope), and each point in the signal (e.g., the envelope) may be processed. For example, the filter window of the simple moving average filter may slide over the signal, and a value of a last point in the filter window may be replaced by an average value of a plurality of points before the last point in the filter window.

In some embodiments, the processing device 120 may reduce the low frequency component by performing a high-pass filter on the envelope of the motion signal. As used herein, a high-pass filter may be a filter that passes signals with a frequency higher than a certain cutoff frequency and attenuates signals with frequencies lower than the cutoff frequency. In some embodiments, the cutoff frequency may be the threshold described in operation 620. In some embodiments, the high-pass filter may include a Butterworth high-pass filter, a Gaussian high-pass filter, or the like, or any combination thereof.

In 640, the processing device 120 (e.g., the amplitude information correction module 424) may determine a target motion signal by correcting, based on the processed envelope, amplitude information of the motion signal.

In some embodiments, the processing device 120 may correct the amplitude information of the motion signal based on amplitude information of the processed envelope. For example, the processing device 120 may determine an amplitude of a point in the processed envelope as an amplitude of a corresponding point (e.g., a corresponding peak, a corresponding valley) in the motion signal.

According to some embodiments of the present disclosure, an envelope of the motion signal may be determined.

A high frequency component of the envelope may be obtained by reducing a low component of the envelope. The amplitude information of the motion signal may be corrected based on the high frequency component of the envelope. Accordingly, the amplitude change in the motion signal of the subject caused by the dynamic distribution of the tracer concentration in the subject may be reduced, and the amplitude information the motion signal may further be corrected.

In 650, the processing device 120 (e.g., the reconstruction module 425) may reconstruct a PET image by gating the PET data based on the target motion signal.

In some embodiments, the processing device 120 may divide the target motion signal (e.g., a target respiratory signal) into a plurality of respiratory phases based on the amplitude of the target motion signal (e.g., the target respiratory signal). For example, a cycle of the target respiratory signal may be divided based on the amplitude of the target respiratory signal. If the amplitude of the target respiratory signal is segmented into n parts (e.g., from the maximum amplitude to the minimum amplitude), the n parts of the target respiratory signal may correspond to n respiratory phases.

The processing device 120 may determine a plurality of groups (or referred to as frames) of gated PET data corresponding to the plurality of respiratory phases. For example, the respiratory signal may correspond to N respiratory phases, and the processing device 120 may gate the PET data into N groups (or frames) of gated PET data based on the N respiratory phases. Each group of gated PET data may correspond to a respiratory phase.

The processing device 120 may reconstruct a plurality of gated PET images based on the gated PET data corresponding to the plurality of respiratory phases. In some embodiments, the processing device 120 may reconstruct a gated PET image for each respiratory phase based on the corresponding group of gated PET data. In some embodiments, the processing device 120 may reconstruct one or more gated PET image for a portion of respiratory phases according to different situations.

In some embodiments, the processing device 120 may use a reconstruction algorithm to reconstruct a gated PET image. Exemplary reconstruction algorithms may include a maximum-likelihood reconstruction of attenuation and activity (MLAA) algorithm, an iterative reconstruction algorithm (e.g., a statistical reconstruction algorithm), a Fourier slice theorem algorithm, a filtered back projection (FBP) algorithm, a compressed sensing (CS) algorithm, a fan-beam reconstruction algorithm, a maximum likelihood expectation maximization (MLEM) algorithm, an ordered subset expectation maximization (OSEM) algorithm, a maximum a posterior (MAP) algorithm, an analytic reconstruction algorithm, or the like, or any combination thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 7A illustrates an exemplary respiratory signal extracted using a conventional data-driven method. FIG. 7B illustrates an exemplary respiratory signal extracted using a VOI based data-driven method without the process of correction illustrated in the present disclosure. FIG. 7C illustrates an exemplary respiratory signal according to the process of correction illustrated in FIGS. 5 and 6 of the present disclosure.

As illustrated in FIGS. 7A-7C, a respiratory signal (e.g., a respiratory signal 710, a respiratory signal 720, a respiratory signal 730) may be expressed in a two-dimensional coordinate system. The two-dimensional coordinate system may include a X axis representing time, and a Y axis representing amplitude. For example, the respiration signal may show the amplitude in the Y axis, and the amplitude may vary depending on the time in the X axis.

As illustrated in FIG. 7A, the respiratory signal 710 may be extracted using a conventional data-driven method. In the first 60 seconds, the respiratory signal 710 fluctuates violently due to the dynamic distribution of tracer concentration in a subject. After 100 seconds, a respiratory motion peak and valley may be barely visible in the respiratory signal 710. As illustrated in FIG. 7B, the respiratory signal 720 may be extracted using a VOI based data-driven method as described in connection with operation 520. The respiratory motion peak and valley may be visually observed in the respiratory signal 720. However, a respiratory cycle and amplitude information of the respiratory signal 720 may need to be corrected, especially in the first 60 seconds. As illustrated in FIG. 7C, the respiratory signal 730 may be determined by correcting the respiratory cycle and the amplitude information of the respiratory signal 720 according to process 500 and process 600 described in the present disclosure. Accordingly, by using the respiratory signal correction method described in the present disclosure, the effect of the dynamic distribution of tracer concentration in the subject on the acquisition of the respiratory signal may be reduced.

Figure 8:
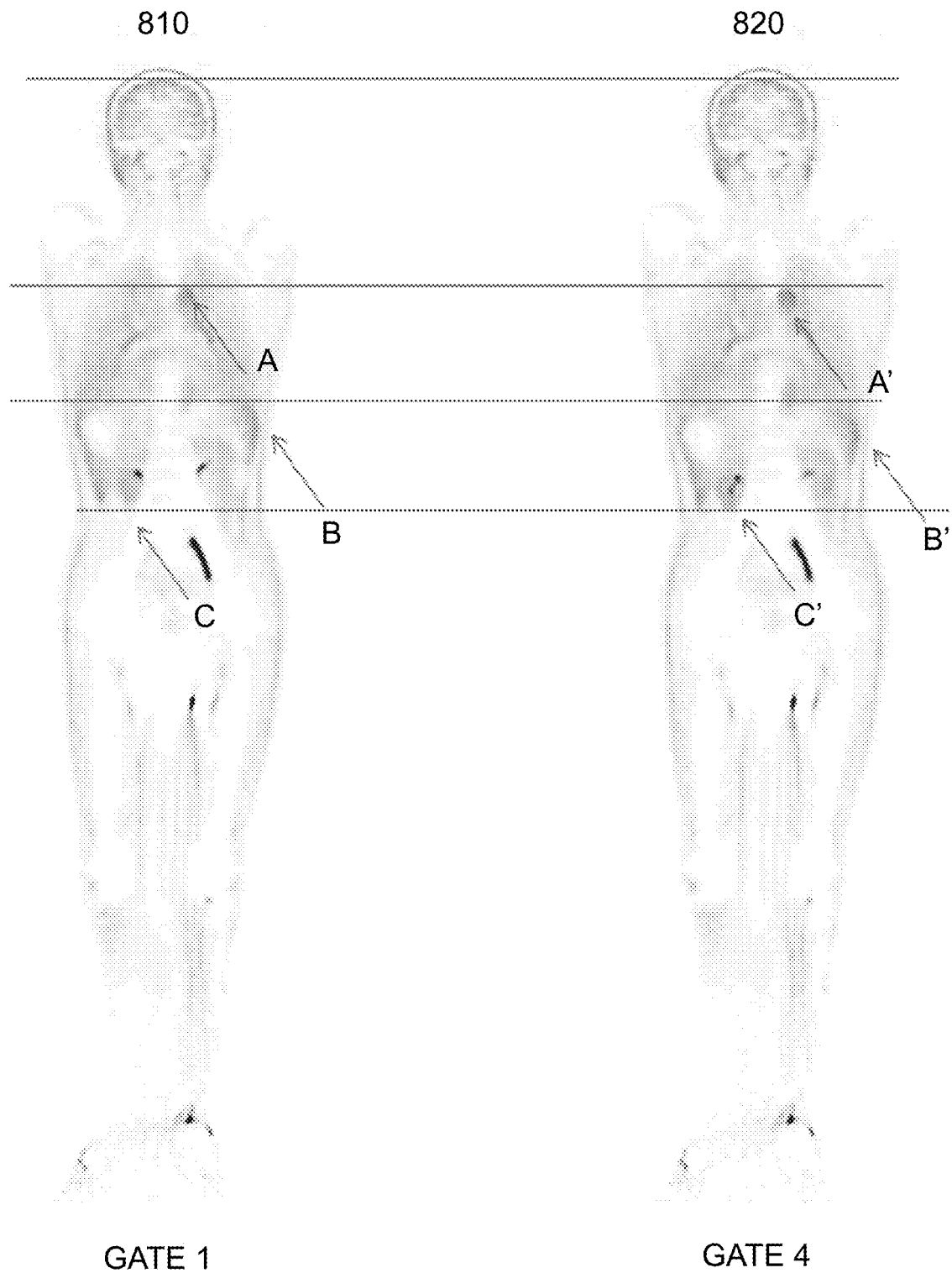
FIG. 8 illustrates exemplary gated PET images according to some embodiments of the present disclosure.

FIG. 8 illustrates exemplary gated PET images according to some embodiments of the present disclosure. As illustrated in FIG. 8, 810 refers to a PET image at gate 1 (e.g., end-inspiration) reconstructed based on gated PET data acquired in first 300 seconds. 820 refers to a PET image at gate 4 (e.g., end-expiration) reconstructed based on the gated PET data acquired in the first 300 seconds. The PET data may be gated based on a respiratory signal corrected according to process 500 and process 600 described in the present disclosure. In order to observe a motion of a tissue or an organ that is influenced by the respiratory motion of a subject in the PET image, a scatter correction and an attenuation correction are not performed on the PET data. As illustrated in FIG. 8, arrow A and arrow A' point to an aortic arch in the upper lung of a subject, arrow B and arrow B' point to the liver of the subject, arrow C and arrow C' point to the kidney of the subject. By comparing the PET image 810 at gate 1 and the PET image 820 at gate 4, the aortic arch in the upper lung of the subject has slight motion, but the liver and the kidney of the subject have large motion during respiration.

Figure 9:
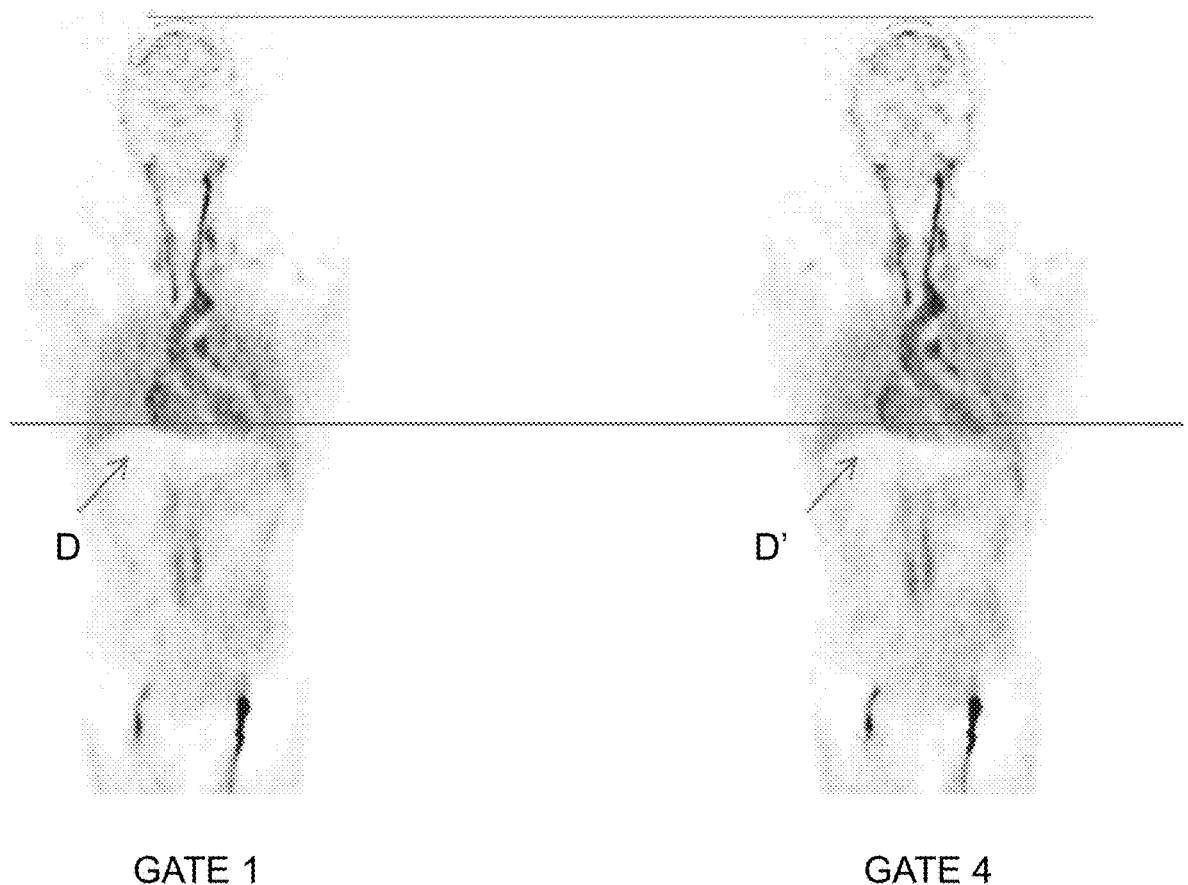
FIG. 9 illustrates exemplary gated PET images according to some embodiments of the present disclosure.

FIG. 9 illustrates exemplary gated PET images according to some embodiments of the present disclosure. As illustrated in FIG. 9, 910 refers to a PET image at gate 1 (e.g., end-inspiration) reconstructed based on gated PET data acquired in first 90 seconds. 920 refers to a PET image at gate 4 (e.g., end-expiration) reconstructed based on the gated PET data acquired in the first 90 seconds. The first 90 seconds may be the time period when the tracer concentration distribution changes drastically in a subject. The PET data may be gated based on a respiratory signal corrected according to process 500 and process 600 described in the present disclosure. In order to observe a motion of a tissue or an organ that is influenced by the respiratory motion of a subject in the PET image, a scatter correction and an attenuation correction are not performed on the PET data. As illustrated in FIG. 9, arrow D and arrow D' point to the liver of the subject. By comparing the PET image 910 at gate 1 and the PET image 920 at gate 4, the liver of the subject have large motion during respiration. Accordingly, PET images reconstructed based on PET data gated according to a corrected respiratory signal may show the motion of a tissue or an organ that is influenced by the respiratory motion of a subject.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

We claim:

1. A method for motion signal recalibration, implemented on a computing device having one or more processors and one or more storage devices, the method comprising:
   obtaining a motion signal of a subject from positron emission tomography (PET) data of the subject, wherein the motion signal represents a plurality of motion cycles, wherein the motion signal includes a respiratory signal including a plurality of peaks and a plurality of valleys;
   determining durations of actual motion cycles based on durations of the plurality of motion cycles;
   correcting the motion cycles of the motion signal by flipping one or more peaks and/or one or more valleys of the respiratory signal based on the durations of actual motion cycles to obtain corrected motion cycles; and reconstructing a PET image by gating the PET data based on the corrected motion cycles.

2. The method of claim 1, wherein the motion cycles are respiratory cycles, and a respiratory cycle includes a duration between adjacent peaks or a duration between adjacent valleys, and a half respiratory cycle includes a duration between a peak and a corresponding valley, wherein determining durations of actual motion cycles based on durations of the plurality of motion cycles comprises:
  determining a distribution of the motion cycles, the distribution of the motion cycles indicates a probability that each motion cycle of the plurality of motion cycles corresponds to an actual motion cycle;
  determining durations of actual motion cycles based on the distribution of the motion cycles,
  wherein determining a distribution of the motion cycles comprises:
    determining a plurality of respiratory cycles based on the respiratory signal;
    determining a first distribution of the respiratory cycles based on the plurality of respiratory cycles, wherein the first distribution includes at least one of an average respiratory cycle, a variance of the respiratory cycles, or a skewness of the first distribution; or
    determining a plurality of half respiratory cycles based on the respiratory signal; and
    determining a second distribution of the half respiratory cycles based on the plurality of half respiratory cycles, wherein the second distribution includes at least one of an average half respiratory cycle, a variance of the half respiratory cycles, or a skewness of the second distribution.

3. The method of claim 2, wherein:
determining the first distribution of the respiratory cycles based on the plurality of respiratory cycles comprises:
  performing a first model fitting on the plurality of respiratory cycles to generate a first model fitting curve; and
determining the second distribution of the half respiratory cycles based on the plurality of half respiratory cycles comprises:
  performing a second model fitting on the plurality of half respiratory cycles to generate a second model fitting curve.

4. The method of claim 3, wherein at least one of the first model fitting or the second model fitting is performed based on at least one of a Gaussian model or a pre-determined model based on population.

5. The method of claim 3, wherein correcting the motion cycles of the motion signals based on the durations of actual motion cycles comprises:
  for each peak of the plurality of peaks of the respiratory signal, determining a first duration between the peak and a corresponding valley, a second duration between the peak and a next peak, and a third duration between the peak and a valley next to the corresponding valley;
  determining a probability that each of the first duration, the second duration, and the third duration corresponds to an actual respiratory cycle based on at least one of the first distribution of the respiratory cycles or the second distribution of the half respiratory cycles;
  determining the first duration, the second duration, or the third duration that has a maximum probability as the duration corresponding to the actual respiratory cycle; and
  correcting the respiratory cycles of the respiratory signal based on the duration corresponding to the actual respiratory cycle.

6. The method of claim 1, wherein obtaining motion signal associated with a subject based on PET data of the subject comprises:
  obtaining the PET data associated with the subject;
  determining a volume of interest (VOI) based on the PET data and a time threshold by deleting a portion of the PET data acquired within the time threshold, the time threshold being related to a change of tracer concentration distribution in the subject over time; and
  determining the motion signal based on the VOI and the PET data.

7. The method of claim 1, wherein the motion signal includes amplitude information, and reconstructing a PET image by gating the PET data based on the corrected motion cycles comprises:
  correcting the amplitude information of the motion signal by processing an envelope of the motion signal, wherein the envelope of the motion signal includes a high frequency component and a low frequency component; and
  reconstructing the PET image based on the corrected motion cycle and the corrected amplitude information of the motion signal.

8. The method of claim 7, wherein reconstructing the PET image based on the corrected motion cycle and the corrected amplitude information of the motion signal comprises:
  determining a target motion signal based on the corrected motion cycle and the corrected amplitude information of the motion signal; and
  reconstructing the PET image by gating, based on the target motion signal, the PET data.

9. The method of claim 7, wherein correcting the amplitude information of the motion signal by processing an envelope of the motion signal comprises:
  determining the envelope of the motion signal;
  processing the envelope of the motion signal by reducing the low frequency component to obtain a processed envelope of the motion signal; and
  correcting the amplitude information of the motion signal based on the processed envelope of the motion signal.

10. The method of claim 7, wherein an amplitude change rate of the high frequency component is less than a threshold, and an amplitude change rate of the low frequency component is greater than the threshold.

11. The method of claim 10, wherein the threshold is 20 seconds.

12. The method of claim 11, wherein the envelope of the motion signal is determined by performing at least one of a Hilbert transformation or a moving-maximum operation on the motion signal.

13. The method of claim 8, wherein processing the envelope of the motion signal by reducing the low frequency component comprises:
  obtaining the low frequency component by performing a moving average filter on the envelope of the motion signal; and
  reducing the low frequency component from the envelope of the motion signal.

14. The method of claim 8, wherein processing the envelope of the motion signal by reducing the low frequency component comprises:
    performing a high-pass filter on the envelope of the motion signal.

15. The method of claim 1, wherein reconstructing a PET image by gating the PET data based on the corrected motion cycles comprises:
    gating the PET data based on a corrected respiratory signal, the corrected respiratory signal including a plurality of corrected motion cycles;
    dividing the corrected respiratory signal into a plurality of respiratory phases; and
    reconstructing a plurality of PET images based on the gated PET data corresponding to the plurality of respiratory phases.

16. The method of claim 15, wherein reconstructing a plurality of PET images based on the gated PET data corresponding to the plurality of respiratory phases comprises:
    determining a plurality of groups of the gated PET data corresponding to the plurality of respiratory phases; and
    for each respiratory phase, reconstructing at least one PET image based on a corresponding group of the gated PET data.

17. The method of claim 15, wherein the dividing the corrected respiratory signal into a plurality of respiratory phases is based on time of the corrected respiratory signal or amplitude information of the corrected respiratory signal.

18. A system, comprising:
    a storage device storing a set of instructions, and
    at least one processor configured to communicate with the storage device, wherein when executing the set of instructions, the at least one processor is configured to cause the system to:
        obtain a motion signal of a subject from positron emission tomography (PET) data of the subject, wherein the motion signal represents a plurality of motion cycles, and different motion cycles include different fluctuation degrees, wherein the motion signal includes a respiratory signal including a plurality of peaks and a plurality of valleys;
        determine a distribution of the motion cycles, wherein the distribution of the motion cycles indicates a probability that each motion cycle of the plurality of motion cycles corresponds to an actual motion cycle;
        correct the motion cycles of the motion signal by flipping one or more peaks and/or one or more valleys of the respiratory signal based on the distribution of the motion cycles to obtain corrected motion cycles; and
        reconstruct a PET image by gating the PET data based on the corrected motion cycles.

19. A non-transitory computer readable medium, comprising executable instructions that, when executed by at least one processor of an electronic device, directs the at least one processor to perform actions comprising:
    obtaining a motion signal of a subject from positron emission tomography (PET) data of the subject, wherein the motion signal represents a plurality of motion cycles, and different motion cycles include different fluctuation degrees, wherein the motion signal includes a respiratory signal including a plurality of peaks and a plurality of valleys;
    determining a distribution of the motion cycles, wherein the distribution of the motion cycles indicates a probability that each motion cycle of the plurality of motion cycles corresponds to an actual motion cycle;
    correcting the motion cycles of the motion signal by flipping one or more peaks and/or one or more valleys of the respiratory signal based on the distribution of the motion cycles to obtain corrected motion cycles; and
    reconstructing a PET image by gating the PET data based on the corrected motion cycles.

* * * * *